United States Patent
Ahn et al.

(10) Patent No.: US 11,769,897 B2
(45) Date of Patent: Sep. 26, 2023

(54) FUEL CELL

(71) Applicants: Hyundai Motor Company, Seoul (KR); Kia Motors Corporation, Seoul (KR); DaeWon Kang Up Co., Ltd., Cheonan-si (KR)

(72) Inventors: Jae Min Ahn, Daejeon (KR); Yong Suk Heo, Seoul (KR); Gin Ook Song, Beopsu-myeon (KR); Byung Keun Lee, Changwon-si (KR)

(73) Assignees: Hyundai Motor Company, Seoul (KR); Kia Motors Corporation, Seoul (KR); DaeWon Kang Up Co., Ltd., Cheonan-si (KR)

( * ) Notice: Subject to any disclaimer, the term of this patent is extended or adjusted under 35 U.S.C. 154(b) by 257 days.

(21) Appl. No.: 17/212,349

(22) Filed: Mar. 25, 2021

(65) Prior Publication Data

US 2022/0140378 A1    May 5, 2022

(30) Foreign Application Priority Data

Oct. 29, 2020    (KR) .................... 10-2020-0142444

(51) Int. Cl.
    H01M 8/2475    (2016.01)
    H01M 8/2485    (2016.01)
    H01M 8/04007   (2016.01)
    H01M 8/2457    (2016.01)
    H01M 8/04029   (2016.01)
    H01M 8/241     (2016.01)

(52) U.S. Cl.
    CPC ..... *H01M 8/2475* (2013.01); *H01M 8/04029* (2013.01); *H01M 8/04037* (2013.01); *H01M 8/241* (2013.01); *H01M 8/2457* (2016.02); *H01M 8/2485* (2013.01)

(58) Field of Classification Search
    CPC ............ H01M 8/0273; H01M 8/0276; H01M 8/04029; H01M 8/0284; H01M 8/04037; H01M 8/241; H01M 8/2457; H01M 8/247; H01M 8/2475; H01M 8/2485
    See application file for complete search history.

(56) References Cited

U.S. PATENT DOCUMENTS

| 10,439,247 | B2   | 10/2019 | Shimizu et al. | |
| 2015/0180056 | A1* | 6/2015 | Hood | H01M 8/241 |
| | | | | 429/457 |
| 2018/0145365 | A1* | 5/2018 | Jin | H01M 8/0223 |
| 2018/0309151 | A1* | 10/2018 | Yamaura | H01M 8/2483 |

* cited by examiner

*Primary Examiner* — Brian R Ohara
*Assistant Examiner* — Brent C Thomas
(74) *Attorney, Agent, or Firm* — Slater Matsil, LLP

(57) ABSTRACT

A fuel cell includes a cell stack including unit cells stacked in a first direction, first and second end plates at first and second ends of the cell stack, respectively, the first and second end plates each including a metal part and a resin part, an enclosure engaged with the first and second end plates to surround the cell stack, a first outer gasket between the resin part of the first end plate and the enclosure and a second outer gasket between the resin part of the second end plate and the enclosure, each of the resin parts including cutoff portions spaced apart from each other, and each of the cutoff portions extending in a second direction intersecting the first direction or in a third direction intersecting each of the first direction and the second direction to expose the metal parts.

20 Claims, 17 Drawing Sheets

FUEL CELL

CROSS-REFERENCE TO RELATED APPLICATIONS

This application claims the benefit of Korean Patent Application No. 10-2020-0142444, filed on Oct. 29, 2020, which application is hereby incorporated herein by reference.

TECHNICAL FIELD

Embodiments relate to a fuel cell.

BACKGROUND

In general, a fuel cell includes a cell stack and an enclosure. In order to protect the cell stack, the enclosure is engaged with end plates, which are disposed at respective side ends of the cell stack. If gaskets, which are disposed between the enclosure and the end plates in order to protect the cell stack from the external environment, do not work properly, external air may enter the cell stack from the outside, leading to deterioration in the performance and durability of the fuel cell.

SUMMARY

Accordingly, embodiments are directed to a fuel cell that substantially obviates one or more problems due to limitations and disadvantages of the related art.

Embodiments provide a fuel cell having improved performance.

A fuel cell according to an embodiment may include a cell stack including a plurality of unit cells stacked in a first direction, an end plate disposed at each of both ends of the cell stack, the end plate including a metal part and a resin part, an enclosure engaged with the end plate so as to surround the cell stack, and an outer gasket disposed between the resin part of the end plate and the enclosure. The resin part may include a plurality of cutoff portions spaced apart from each other. Each of the plurality of cutoff portions may extend in a second direction intersecting the first direction or in a third direction intersecting each of the first direction and the second direction to expose the metal part.

For example, the fuel cell may further include an end cell heater, disposed between a cell located at each of both ends of the cell stack and the end plate, and an inner gasket, disposed around a manifold between the resin part of the end plate and the end cell heater.

For example, among the plurality of cutoff portions, a cutoff portion extending in the second direction may overlap the manifold in the third direction. Among the plurality of cutoff portions, a cutoff portion extending in the third direction may overlap the manifold in the second direction.

For example, the plurality of cutoff portions may have a shape symmetrical in at least one of the second direction or the third direction.

For example, the manifold may include a hydrogen inlet and an oxygen inlet disposed opposite each other in the state of being spaced apart from each other in the second direction, an oxygen outlet disposed below the hydrogen inlet in the state of being spaced apart from the hydrogen inlet in the third direction, and a hydrogen outlet disposed below the oxygen inlet in the state of being spaced apart from the oxygen inlet in the third direction.

For example, the plurality of cutoff portions included in the end plate disposed at one of both ends of the cell stack may include a first cutoff portion overlapping one having a greater length in the third direction, among the hydrogen inlet and the oxygen inlet, in the second direction, a second cutoff portion overlapping one having a greater length in the third direction, among the hydrogen outlet and the oxygen outlet, in the second direction, a third cutoff portion overlapping one having a greater length in the second direction, among the hydrogen inlet and the oxygen outlet, in the third direction, and a fourth cutoff portion overlapping one having a greater length in the second direction, among the oxygen inlet and the hydrogen outlet, in the third direction.

For example, the plurality of cutoff portions may further include a fifth cutoff portion disposed between the first cutoff portion and the third cutoff portion, a sixth cutoff portion disposed between the first cutoff portion and the fourth cutoff portion, a seventh cutoff portion disposed between the second cutoff portion and the third cutoff portion, and an eighth cutoff portion disposed between the second cutoff portion and the fourth cutoff portion.

For example, the plurality of cutoff portions may further include a ninth cutoff portion disposed between the first cutoff portion and the second cutoff portion.

For example, the manifold may further include a coolant inlet and a coolant outlet disposed so as to be spaced apart from each other in the second direction.

For example, the plurality of cutoff portions included in the end plate disposed at the other one of both ends of the cell stack may include a tenth cutoff portion overlapping the coolant inlet in the third direction, an eleventh cutoff portion overlapping the coolant outlet in the third direction, and a twelfth cutoff portion overlapping one having a greater length in the third direction, among the coolant inlet and the coolant outlet, in the second direction.

For example, the twelfth cutoff portion may have a shape that overlaps the coolant inlet and the coolant outlet in the second direction.

For example, the plurality of cutoff portions may further include a thirteenth cutoff portion disposed between the tenth cutoff portion and the twelfth cutoff portion and a fourteenth cutoff portion disposed between the eleventh cutoff portion and the twelfth cutoff portion.

For example, the metal part may include a first inner surface facing the enclosure in the first direction and a second inner surface located under the first inner surface and facing the end cell heater in the first direction. The second inner surface may have a cross-sectional shape that protrudes further than the first inner surface in the first direction.

For example, the resin part may include an outer resin part embedded inside the first inner surface of the metal part such that the outer gasket is disposed thereon and an inner resin part disposed on the second inner surface of the metal part such that the inner gasket is disposed thereon. The plurality of cutoff portions may be located between the outer resin part and the inner resin part.

For example, the fuel cell may further include an outer groove receiving an outer protrusion protruding from the outer gasket toward the enclosure and an inner groove receiving the inner gasket protruding toward the end cell heater.

For example, the length by which the outer protrusion protrudes from the first inner surface of the metal part in the first direction may be less than or equal to a predetermined length, and the outer groove may be formed in the outer resin part.

For example, the length by which the outer protrusion protrudes from the first inner surface of the metal part in the first direction may be greater than the predetermined length, and the outer groove may be formed in the enclosure.

For example, the inner groove may be formed in the end cell heater.

For example, the outer gasket may include a first outer surface facing the enclosure in the first direction, a first inner surface facing the outer resin part and disposed opposite the first outer surface, and a first fixing portion having a protrusion shape protruding from the first inner surface toward the outer resin part.

For example, the inner gasket may include a second outer surface facing the end cell heater in the first direction, a second inner surface facing the inner resin part and disposed opposite the second outer surface, and a second fixing portion having a protrusion shape protruding from the second inner surface toward the inner resin part.

For example, the resin part, the outer gasket, and the inner gasket may be integrally formed with each other.

BRIEF DESCRIPTION OF THE DRAWINGS

Arrangements and embodiments may be described in detail with reference to the following drawings in which like reference numerals refer to like elements and wherein.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, fuel cells 100 (100A to 100F) according to embodiments will be described with reference to the accompanying drawings. The fuel cells 100 (100A to 100F) will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely. Hereinafter, for convenience of description, the +x-axis direction or the −x-axis direction will be referred to as a "first direction", the +y-axis direction or the −y-axis direction will be referred to as a "second direction", and the +z-axis direction or the −z-axis direction will be referred to as a "third direction".

Figure 1:
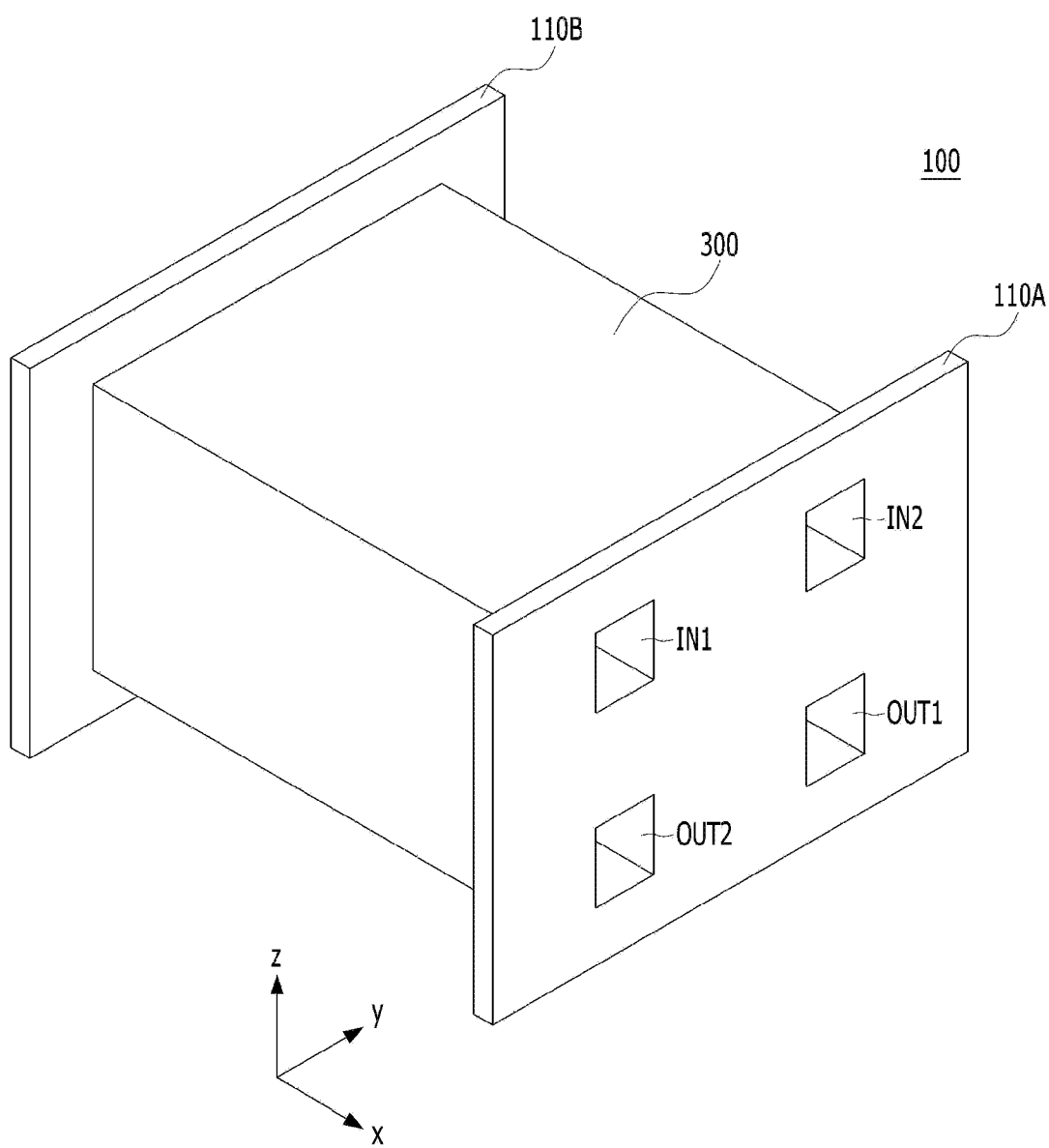
FIG. 1 is a perspective view showing the external appearance of a fuel cell according to an embodiment.
Figure 2:
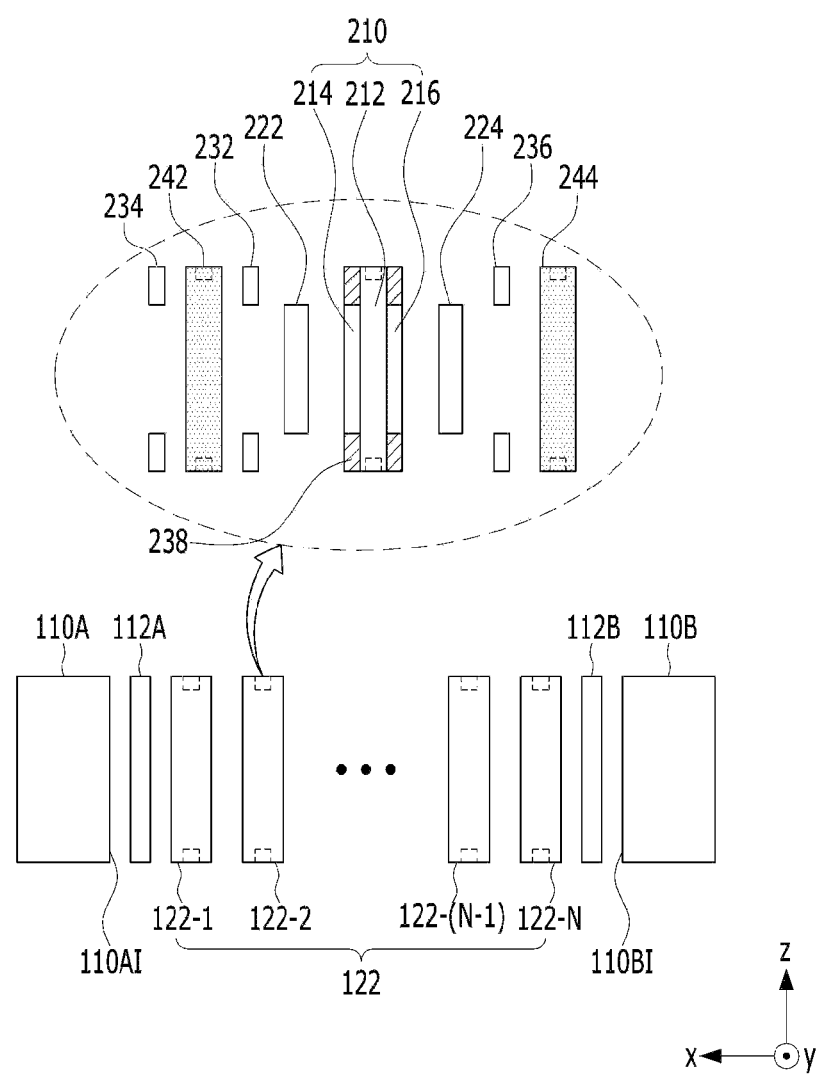
FIG. 2 is a cross-sectional view showing one example of a cell stack included in the fuel cell.

FIG. 1 is a perspective view showing the external appearance of a fuel cell 100 according to an embodiment, and FIG. 2 is a cross-sectional view showing one example of a cell stack 122 included in the fuel cell 100. An enclosure 300 shown in FIG. 1 and outer and inner gaskets, which will be described later, are not illustrated in FIG. 2.

The fuel cell 100 may be, for example, a polymer electrolyte membrane fuel cell (or a proton exchange membrane fuel cell) (PEMFC), which has been studied most extensively as a power source for driving vehicles. However, the embodiment is not limited to any specific form of the fuel cell.

The fuel cell 100 may include end plates (or pressing plates or compression plates) 110A and 110B, a cell stack 12, and an enclosure 300.

The enclosure 300 shown in FIG. 1 may be engaged with the end plates 110A and 110B, and may be disposed so as to surround at least a portion of the side portions of the cell stack 122 that is disposed between the end plates 110A and 110B. For example, the enclosure 300 may surround all sides of the cell stack 122. Alternatively, the enclosure 300 may surround some of the sides of the cell stack 122, and a separate member may surround the remaining sides of the cell stack 122. The enclosure 300 may serve to clamp a plurality of unit cells together with the end plates 110A and 110B in the first direction. In other words, the clamping pressure of the cell stack 122 may be maintained by the enclosure 300 and the end plates 110A and 110B, which have rigid structures.

Each of the end plates 110A and 110B may be disposed at a respective one of both side ends of the cell stack 122, and may support and fix the unit cells. That is, the first end plate 110A may be disposed at one side end of the cell stack 122, and the second end plate 110B may be disposed at the opposite side end of the cell stack 122.

The fuel cell 100 may include a plurality of manifolds M. The manifolds may include a first inflow communication portion (or a first inlet manifold) IN1, a second inflow communication portion (or a second inlet manifold) IN2, a third inflow communication portion (or a third inlet manifold) IN3, a first outflow communication portion (or a first outlet manifold) OUT1, a second outflow communication portion (or a second outlet manifold) OUT2, and a third outflow communication portion (or a third outlet manifold) OUT3.

One of the first and second inflow communication portions IN1 and IN2 may correspond to a hydrogen inlet through which hydrogen, which is a reactant gas, is introduced into the cell stack 122 from the outside, and the other one of the first and second inflow communication portions IN1 and IN2 may correspond to an oxygen inlet through which oxygen, which is a reactant gas, is introduced into the cell stack 122 from the outside. In addition, one of the first and second outflow communication portions OUT1 and OUT2 may correspond to an oxygen outlet through which oxygen, which is a reactant gas, and condensate water are discharged out of the cell stack 122, and the other one of the first and second outflow communication portions OUT1 and OUT2 may correspond to a hydrogen outlet through which hydrogen, which is a reactant gas, and condensate water are discharged out of the cell stack 122. In addition, the third inflow communication portion IN3 may correspond to a coolant inlet through which a cooling medium (e.g. coolant) is introduced from the outside, and the third outflow communication portion OUT3 may correspond to a coolant outlet through which a cooling medium is discharged to the outside.

The first and second outflow communication portions OUT1 and OUT2 may be disposed below the first and second inflow communication portions IN1 and IN2, the first inflow communication portion IN1 and the first outflow communication portion OUT1 may be disposed at positions separated from each other in a diagonal direction, and the second inflow communication portion IN2 and the second outflow communication portion OUT2 may be disposed at positions separated from each other in a diagonal direction. In the case in which the first and second inflow communication portions IN1 and IN2 and the first and second outflow communication portions OUT1 and OUT2 are disposed as described above, condensate water may be discharged from the lower portions of the unit cells included in the cell stack 122, or may remain in the lower portions of the unit cells due to gravity.

According to one embodiment, the first and second inflow communication portions IN1 and IN2 and the first and second outflow communication portions OUT1 and OUT2 may be included in any one of the first and second end plates 110A and 110B (e.g. the first end plate 110A, as shown in FIG. 1), and the third inflow communication portion IN3 and the third outflow communication portion OUT3 may be included in the other one of the first and second end plates 110A and 110B (e.g. the second end plate 110B shown in FIG. 1).

According to another embodiment, all of the first to third inflow communication portions IN1 to IN3 and the first to third outflow communication portions OUT1 to OUT3 may be included in any one of the first and second end plates 110A and 110B.

Referring to FIG. 2, the cell stack 122 may include a plurality of unit cells 122-1 to 122-N, which are stacked in the first direction. Here, "N" is a positive integer of 1 or greater, and may range from several tens to several hundreds. "N" may be determined depending on the intensity of power to be supplied from the fuel cell 100 to a load. Here, "load" may refer to a part requiring power in a vehicle that uses a fuel cell.

Each unit cell 122-$n$ may include a membrane electrode assembly (MEA) 210, gas diffusion layers (GDLs) 222 and 224, gaskets 232, 234 and 236, and separators (or bipolar plates) 242 and 244. Here, $1 \leq n \leq N$.

The membrane electrode assembly 210 has a structure in which catalyst electrode layers, in which electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (or a hydrogen electrode or an anode) 214, and an air electrode (or an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell 100, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the separators 242 and 244 and the gas diffusion layers 222 and 224 which are conductors. In order to realize the above operation, a catalyst layer may be applied to each of the fuel electrode 214 and the air electrode 216. The movement of the electrons described above causes the electrons to flow through an external wire, thus generating current. That is, the fuel cell 100 may generate electric power due to the electrochemical reaction between hydrogen, which is the fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction that generates water (hereinafter referred to as "condensate water" or "product water"). The condensate water generated in the air electrode 216 may penetrate the polymer electrolyte membrane 212 and may be transferred to the fuel electrode 214.

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reactant gases, and to transfer the generated electrical energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive.

The second gas diffusion layer 224 may serve to diffuse and uniformly distribute air supplied as a reactant gas through the second separator 244, and may be electrically conductive.

Each of the first and second gas diffusion layers 222 and 224 may be a microporous layer in which fine carbon fibers are combined. However, the embodiment is not limited to any specific configuration of the first and second gas diffusion layers 222 and 224.

The gaskets 232, 234 and 236 may serve to maintain the airtightness and clamping pressure of the cell stack at an appropriate level with respect to the reactant gases and the coolant, to disperse the stress when the separators 242 and 244 are stacked, and to independently seal the flow paths. As such, since airtightness and watertightness are maintained by the gaskets 232, 234 and 236, the flatness of the surfaces that are adjacent to the cell stack 122, which generates electric power, may be secured, and thus surface pressure may be distributed uniformly over the reaction surfaces of the cell stack 122.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to current-collecting plates (not shown).

The separators 242 and 244 may be respectively disposed outside the gas diffusion layers 222 and 224. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. To this end, the first separator 242 may include an anode plate (AP), in which a channel (i.e. a passage or a flow path) is formed so that hydrogen may flow therethrough.

The second separator 244 serves to supply air as a reactant gas to the air electrode 216 through the second gas diffusion layer 224. To this end, the second separator 244 may include a cathode plate (CP), in which a channel is formed so that air containing oxygen may flow therethrough. In addition, each of the first and second separators 242 and 244 may form a channel through which a cooling medium may flow.

Further, the separators 242 and 244 may be formed of a graphite-based material, a composite graphite-based material, or a metal-based material. However, the embodiment is not limited to any specific material of the separators 242 and 244.

For example, each of the first and second separators 242 and 244 may include the first to third inflow communication portions IN1, IN2 and IN3 and the first to third outflow communication portions OUT1, OUT2 and OUT3.

That is, the reactant gases required for the membrane electrode assembly 210 may be introduced into the cell through the first and second inflow communication portions IN1 and IN2, and gas or liquid, in which the reactant gases humidified and supplied to the cell and the condensate water generated in the cell are combined, may be discharged to the outside of the fuel cell 100 through the first and second outflow communication portions OUT1 and OUT2.

Each of the first and second end plates 110A and 110B may be configured such that a metal insert (hereinafter referred to as a "metal part") is surrounded by a resin product (hereinafter referred to as a "resin part"). Here, the resin part may be made of a synthetic resin-rubber-based material or plastic, but the embodiment is not limited to any specific material of the resin part. The metal part of each of the first and second end plates 110A and 110B may have high rigidity to withstand internal surface pressure, and may be formed by machining a metal material. For example, the first and second end plates 110A and 110B may be formed by combining a plurality of plates, but the embodiment is not limited to any specific configuration of the first and second end plates 110A and 110B.

The current-collecting plates may be disposed between the first and second end plates 110A and 110B, which face the cell stack 122, and the cell stack 122. The current-collecting plates serve to collect electrical energy, which is generated by the flow of electrons in the cell stack 122, and to supply the collected electrical energy to a load of the vehicle that uses the fuel cell 100.

A first end cell heater 112A may be disposed between the cell 122-1 located at one end of the cell stack 122 and the inner surface 110AI of the first end plate 110A, and a second end cell heater 112B may be disposed between the cell 122-N located at the opposite end of the cell stack 122 and the inner surface 110BI of the second end plate 110B.

In addition, the fuel cell 100 (100A to 100F) according to the embodiment may further include an outer gasket.

Figure 3:
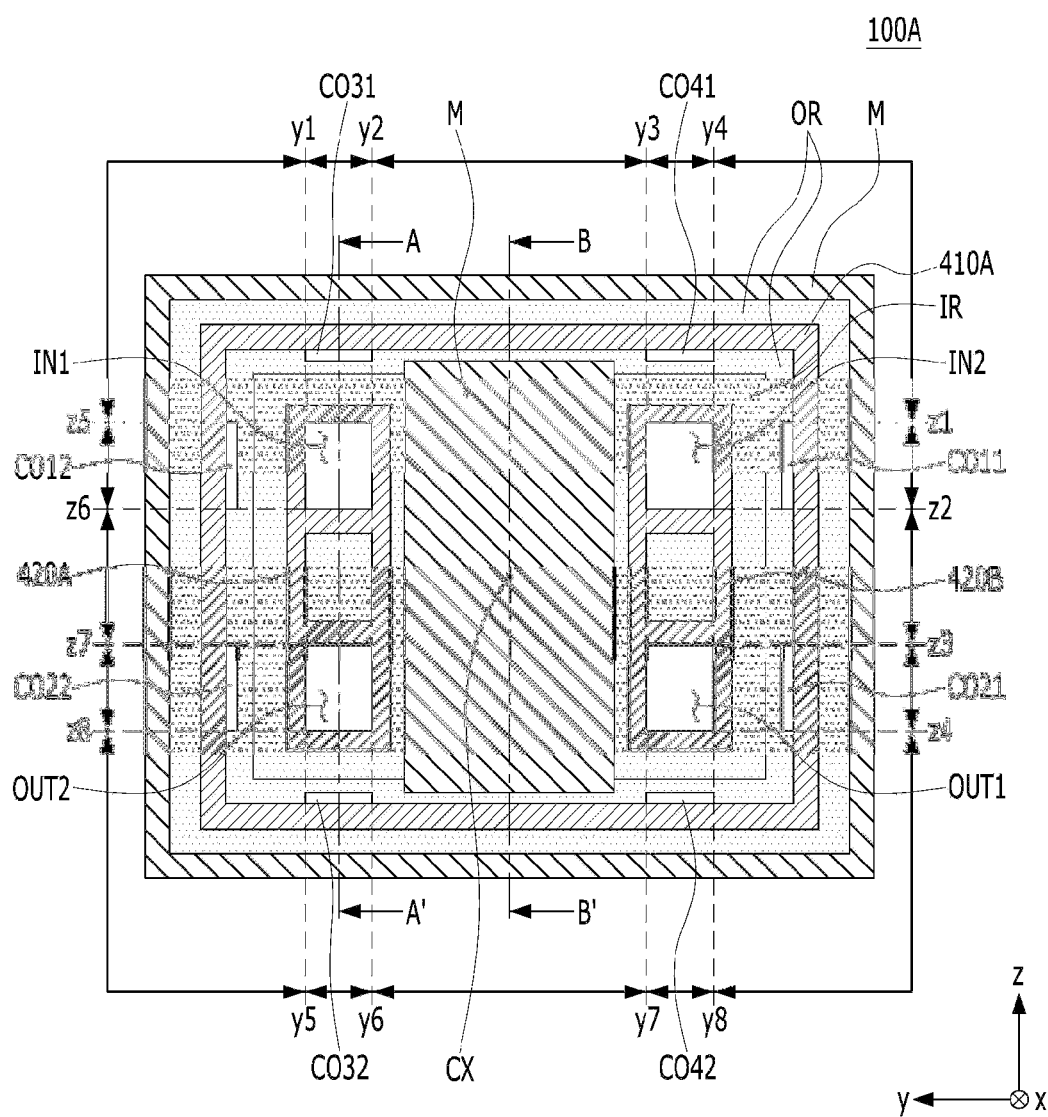
FIG. 3 is a view showing a portion of a fuel cell according to an embodiment.
Figure 4:
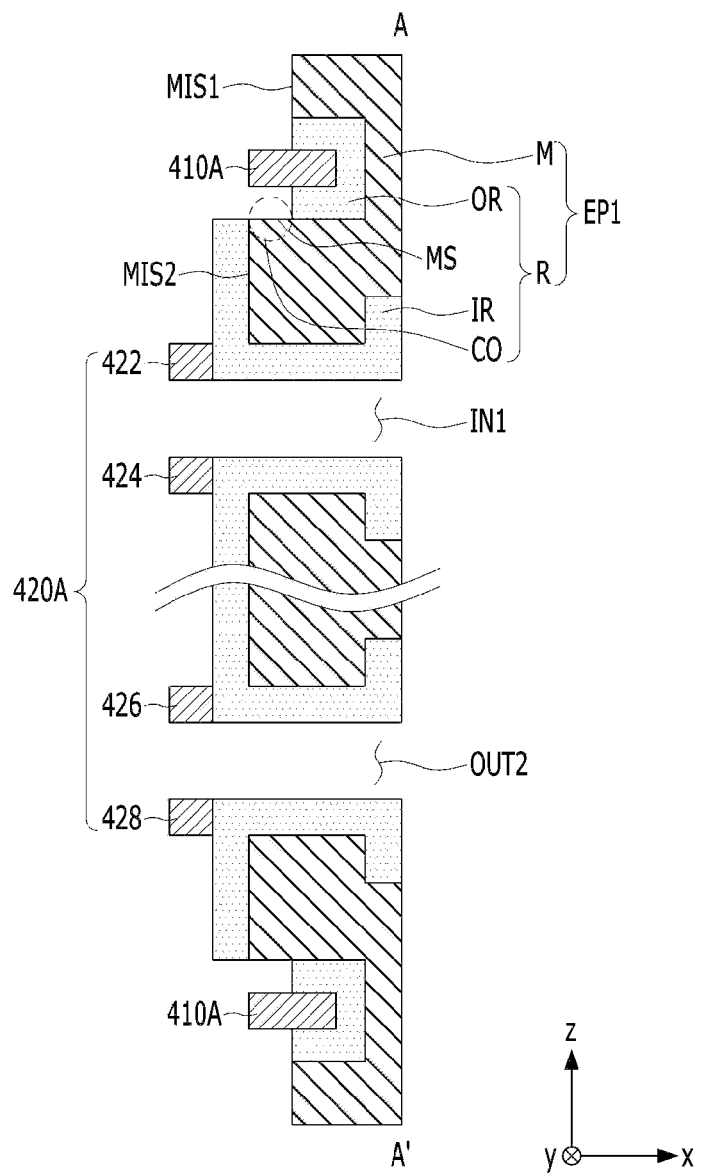
FIG. 4 is a cross-sectional view taken along line A-A' in the fuel cell shown in FIG. 3.
Figure 5:
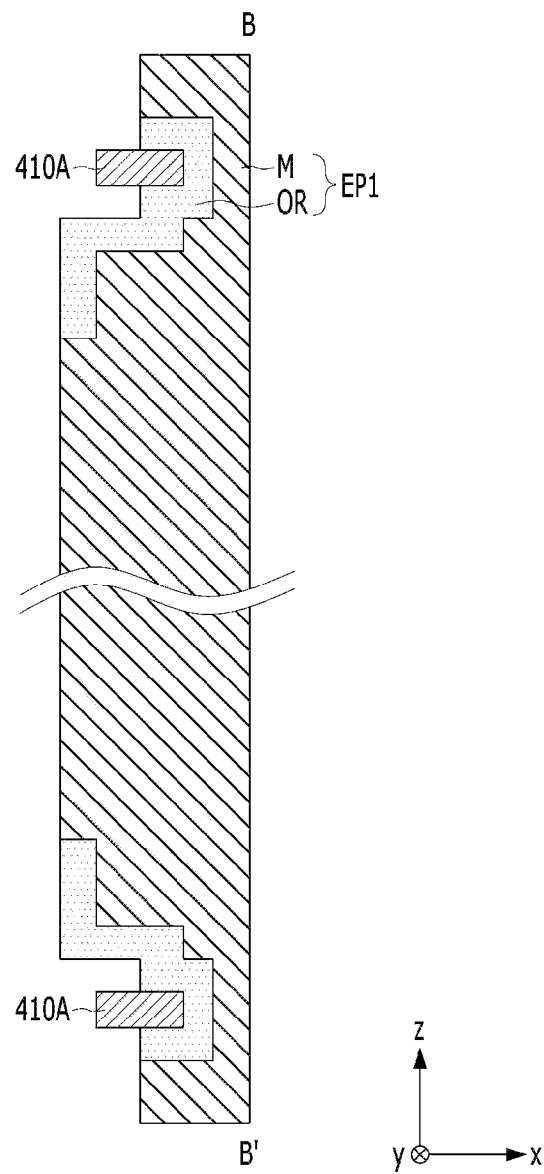
FIG. 5 is a cross-sectional view taken along line B-B' in the fuel cell shown in FIG. 3.

FIG. 3 is a view showing a portion of a fuel cell 100A according to an embodiment, FIG. 4 is a cross-sectional view taken along line A-A' in the fuel cell 100A shown in FIG. 3, and FIG. 5 is a cross-sectional view taken along line B-B' in the fuel cell 100A shown in FIG. 3.

For convenience of description, FIGS. 3 to 5 illustrate only a first end plate EP1, an outer gasket 410A, and inner gaskets 420A and 420B of the fuel cell 100A.

The first end plate EP1, the hydrogen inlet IN1, the oxygen inlet IN2, the hydrogen outlet OUT1, and the oxygen outlet OUT2 shown in FIGS. 3 to 5 correspond to the first end plate 110A, the first inflow communication portion IN1, the second inflow communication portion IN2, the first outflow communication portion OUT1, and the second outflow communication portion OUT2 shown in FIGS. 1 and 2, respectively. According to another embodiment, in FIG. 3, "IN1" may correspond to an oxygen inlet, "IN2" may correspond to a hydrogen inlet, "OUT1" may correspond to an oxygen outlet, and "OUT2" may correspond to a hydrogen outlet.

The hydrogen inlet IN1 and the oxygen inlet IN2 may be disposed opposite each other in the state of being spaced apart from each other in the second direction. The hydrogen outlet OUT1 may be disposed below the oxygen inlet IN2 in the state of being spaced apart from the oxygen inlet IN2 in the third direction. The oxygen outlet OUT2 may be disposed below the hydrogen inlet IN1 in the state of being spaced apart from the hydrogen inlet IN1 in the third direction.

Referring to FIGS. 3 and 4, the first end plate EP1 may include a metal part M and a resin part R.

The metal part M of the first end plate EP1 may include a first inner surface MIS1 and a second inner surface MIS2. The first inner surface MIS1 is a surface that faces the enclosure 300 in the first direction, and the second inner surface MIS2 is a surface that is located under the first inner surface MIS1 and faces the first end cell heater 112A in the first direction. The second inner surface MIS2 may have a cross-sectional shape that protrudes further than the first inner surface MIS1 toward the unit cell 122-1 of the cell stack 122 in the first direction.

The resin part R may include an outer resin part OR and an inner resin part IR. The outer resin part OR may be embedded inside the first inner surface MIS1 of the metal part M, and the inner resin part IR may be disposed on the second inner surface MIS2 of the metal part M.

The outer gasket 410A may be inserted between the first end plate 110A and the enclosure 300 to perform waterproofing and dustproofing functions, thereby protecting the cell stack 122 from the outside. The outer gasket 410A may also prevent the internal environment of the cell stack 122 from being exposed to the outside. To this end, the outer gasket 410A may be disposed between the resin part R of the first end plate EP1, i.e. the outer resin part OR, and the enclosure 300. For example, as shown in FIGS. 4 and 5, the outer gasket 410A may be embedded in the outer resin part OR.

The inner gaskets 420A and 420B serve to maintain airtightness of the flow paths for the reactant gases and coolant between the first end plate 110A and the first end cell heater 112A. To this end, the inner gaskets 420A and 420B may be disposed between the inner resin part IR of the first end plate EP1 and the first end cell heater 112A. The inner gaskets 420A (422, 424, 426 and 428) and 420B may be disposed on the inner resin part IR around the manifolds. For example, the first inner gasket 420A may be disposed around the hydrogen inlet IN1 and the oxygen outlet OUT2, and the second inner gasket 420B may be disposed around the oxygen inlet IN2 and the hydrogen outlet OUT1.

In addition, according to the embodiment, the resin part R of the first end plate EP1 may further include a plurality of cutoff portions CO (or cutout portions), which are spaced apart from each other. Each of the cutoff portions CO may extend in the second or third direction, and may expose the metal part M. Here, the second direction may be a direction intersecting the first direction, and the third direction may be a direction intersecting each of the first and second directions.

The resin part R shown in FIG. 5 does not include a cutoff portion, whereas the resin part R shown in FIG. 4 includes the cutoff portions CO. The cutoff portions CO may be formed by cutting off portions between the outer resin part OR and the inner resin part IR in the resin part R.

Figure 6:
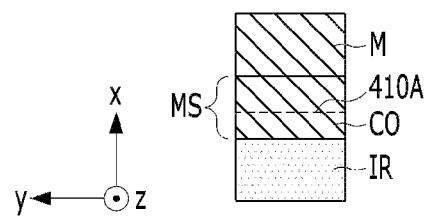
FIG. 6 is a plan view showing a portion of the fuel cell shown in FIG. 4.

FIG. 6 is a plan view showing a portion of the fuel cell 100A shown in FIG. 4.

The first end plate EP1 of the fuel cell 100A shown in FIG. 6 includes the metal part M, the inner resin part IR, and the cutoff portions CO. For better understanding of the cutoff portions CO, the outer gasket 410A is indicated by dotted lines.

Referring to FIG. 6, it can be seen that the cutoff portions CO are located between the outer resin part OR and the inner resin part IR and expose the metal part M.

According to an embodiment, as illustrated in FIG. 3, the cutoff portions may include first cutoff portions CO11 and CO12, second cutoff portions CO21 and CO22, third cutoff portions CO31 and CO32, and fourth cutoff portions CO41 and CO42.

Figure 7:
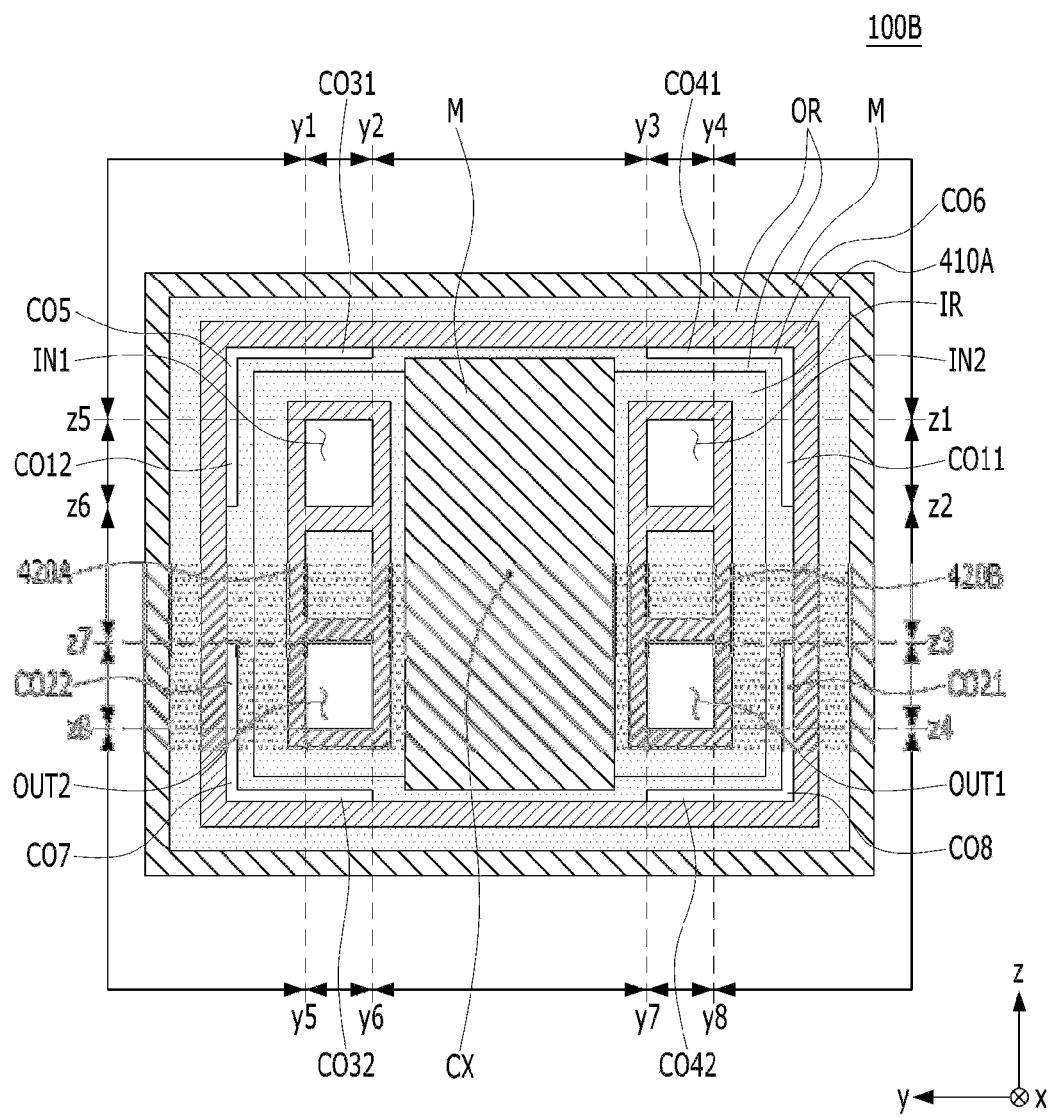
FIG. 7 is a view showing a portion of a fuel cell according to another embodiment.
Figure 8:
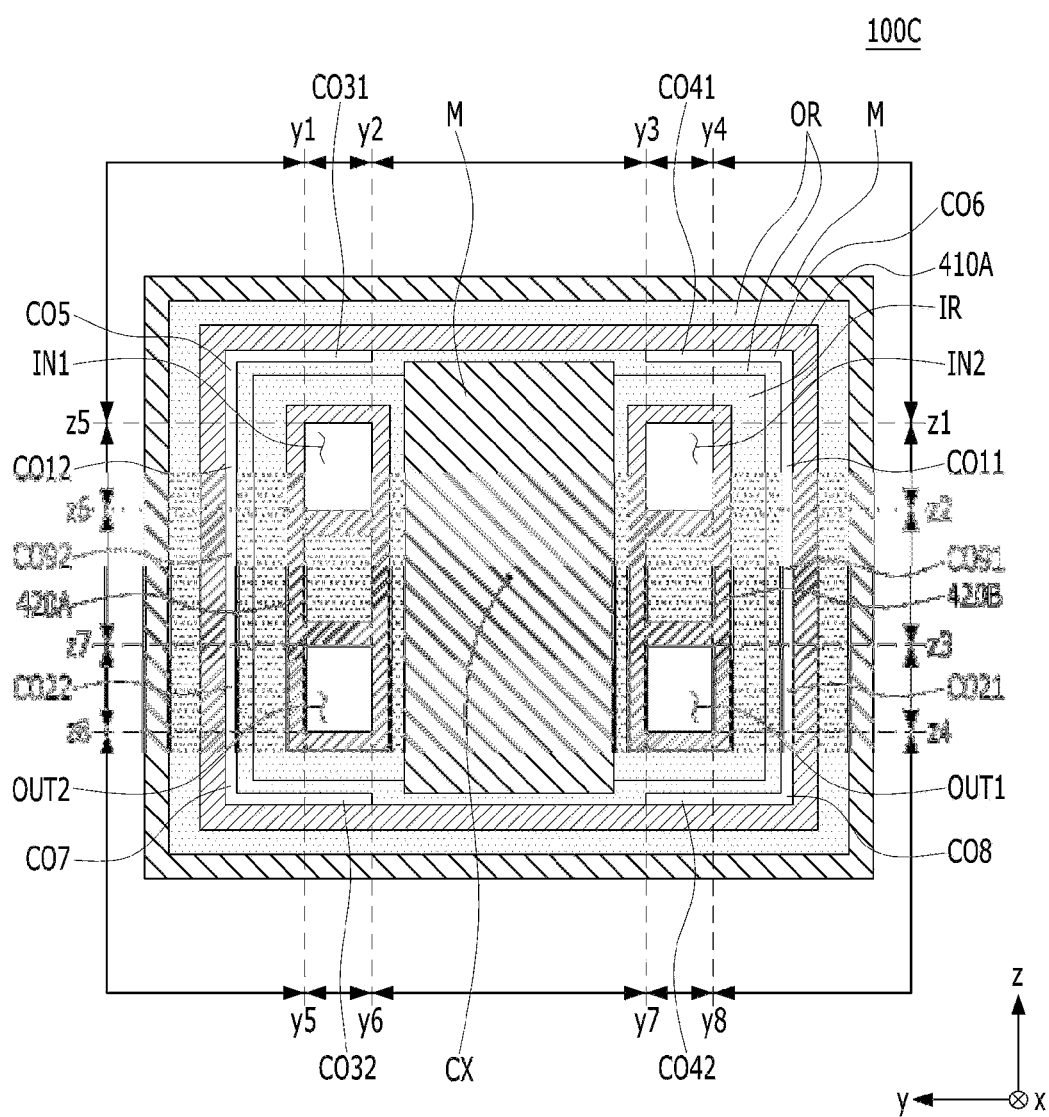
FIG. 8 is a view showing a portion of a fuel cell according to still another embodiment.

In FIG. 3 and FIGS. 7 and 8 to be described later, the cutoff portions CO are not visible. However, for better understanding, areas in which the cutoff portions are disposed are indicated in each drawing.

The first cutoff portions CO11 and CO12 may have a shape that overlaps one having a greater length in the third direction, among the hydrogen inlet IN1 and the oxygen inlet IN2, in the second direction. For example, the length of the first cutoff portions CO11 and CO12 in the third direction may be less than or equal to the length of the one having the greater length in the third direction, among the hydrogen inlet IN1 and the oxygen inlet IN2. In FIG. 3, it is illustrated that the length of the hydrogen inlet IN1 in the third direction and the length of the oxygen inlet IN2 in the third direction are the same. However, when the length of the hydrogen inlet IN1 in the third direction is greater than the length of the oxygen inlet IN2 in the third direction, the first cutoff portions CO11 and CO12 may have a shape that overlaps the hydrogen inlet IN1 in the second direction. The $1\text{-}1^{st}$ cutoff portion CO11 may be located between z1 and z2, and the $1\text{-}2^{nd}$ cutoff portion CO12 may be located between z5 and z6.

The second cutoff portions CO21 and CO22 may have a shape that overlaps one having a greater length in the third direction, among the hydrogen outlet OUT1 and the oxygen outlet OUT2, in the second direction.

For example, the length of the second cutoff portions CO21 and CO22 in the third direction may be less than or equal to the length of the one having the greater length in the third direction, among the hydrogen outlet OUT1 and the oxygen outlet OUT2. In FIG. 3, it is illustrated that the length of the hydrogen outlet OUT1 in the third direction and the length of the oxygen outlet OUT2 in the third direction are the same. However, when the length of the oxygen outlet OUT2 in the third direction is greater than the length of the hydrogen outlet OUT1 in the third direction, the second cutoff portions CO21 and CO22 may have a shape that overlaps the oxygen outlet OUT2 in the second direction. The $2\text{-}1^{st}$ cutoff portion CO21 may be located between z3 and z4, and the $2\text{-}2^{nd}$ cutoff portion CO22 may be located between z7 and z8.

The third cutoff portions CO31 and CO32 may have a shape that overlaps one having a greater length in the second direction, among the hydrogen inlet IN1 and the oxygen outlet OUT2, in the third direction. For example, the length of the third cutoff portions CO31 and CO32 in the second direction may be less than or equal to the length of the one having the greater length in the second direction, among the hydrogen inlet IN1 and the oxygen outlet OUT2. In FIG. 3, it is illustrated that the length of the hydrogen inlet IN1 in the second direction and the length of the oxygen outlet OUT2 in the second direction are the same. However, when the length of the hydrogen inlet IN1 in the second direction is greater than the length of the oxygen outlet OUT2 in the second direction, the third cutoff portions CO31 and CO32 may have a shape that overlaps the hydrogen inlet IN1 in the third direction. The $3\text{-}1^{st}$ cutoff portion CO31 may be located between y1 and y2, and the $3\text{-}2^{nd}$ cutoff portion CO32 may be located between y5 and y6.

The fourth cutoff portions CO41 and CO42 may have a shape that overlaps one having a greater length in the second direction, among the oxygen inlet IN2 and the hydrogen outlet OUT1, in the third direction. For example, the length of the fourth cutoff portions CO41 and CO42 in the second direction may be less than or equal to the length of the one having the greater length in the second direction, among the oxygen inlet IN2 and the hydrogen outlet OUT1. In FIG. 3, it is illustrated that the length of the oxygen inlet IN2 in the second direction and the length of the hydrogen outlet OUT1 in the second direction are the same. However, when the length of the oxygen inlet IN2 in the second direction is greater than the length of the hydrogen outlet OUT1 in the second direction, the fourth cutoff portions CO41 and CO42 may have a shape that overlaps the oxygen inlet IN2 in the third direction. The 4-$1^{st}$ cutoff portion CO41 may be located between y3 and y4, and the 4-$2^{nd}$ cutoff portion CO42 may be located between y7 and y8.

FIG. 7 is a view showing a portion of a fuel cell 100B according to another embodiment.

Unlike what is illustrated in FIG. 3, the resin part R of the first end plate EP1 shown in FIG. 7 further includes fifth to eighth cutoff portions. Except for this, the fuel cell 100B shown in FIG. 7 is the same as the fuel cell 100A shown in FIG. 3. The same parts are denoted by the same reference numerals, and a duplicate description thereof will be omitted.

The fifth cutoff portion CO5 may be disposed between one CO12 of the first cutoff portions CO11 and CO12 and one CO31 of the third cutoff portions CO31 and CO32. That is, the fifth cutoff portion CO5 may be located between y1 and z5.

The sixth cutoff portion CO6 may be disposed between the other one CO11 of the first cutoff portions CO11 and CO12 and one CO41 of the fourth cutoff portions CO41 and CO42. That is, the sixth cutoff portion CO6 may be located between y4 and z1.

The seventh cutoff portion CO7 may be disposed between one CO22 of the second cutoff portions CO21 and CO22 and the other one CO32 of the third cutoff portions CO31 and CO32. That is, the seventh cutoff portion CO7 may be located between y5 and z8.

The eighth cutoff portion CO8 may be disposed between the other one CO21 of the second cutoff portions CO21 and CO22 and the other one CO42 of the fourth cutoff portions CO41 and CO42. That is, the eighth cutoff portion CO8 may be located between y8 and z4.

FIG. 8 is a view showing a portion of a fuel cell 100C according to still another embodiment.

Unlike what is illustrated in FIG. 7, the resin part R of the first end plate EP1 shown in FIG. 8 further includes ninth cutoff portions. Except for this, the fuel cell 100C shown in FIG. 8 is the same as the fuel cell 100B shown in FIG. 7. The same parts are denoted by the same reference numerals, and a duplicate description thereof will be omitted.

The ninth cutoff portions CO91 and CO92 may be disposed between the first cutoff portions CO11 and CO12 and the second cutoff portions CO21 and CO22. That is, the 9-$1^{st}$ cutoff portion CO91 may be disposed between the 1-$1^{st}$ cutoff portion CO1 and the 2-$1^{st}$ cutoff portion CO21, and the 9-$2^{nd}$ cutoff portion CO92 may be disposed between the 1-$2^{nd}$ cutoff portion CO12 and the 2-$2^{nd}$ cutoff portion CO22. The 9-$1^{st}$ cutoff portion CO91 may be disposed between z2 and z3, and the 9-$2^{nd}$ cutoff portion CO92 may be disposed between z6 and z7.

Figure 9:
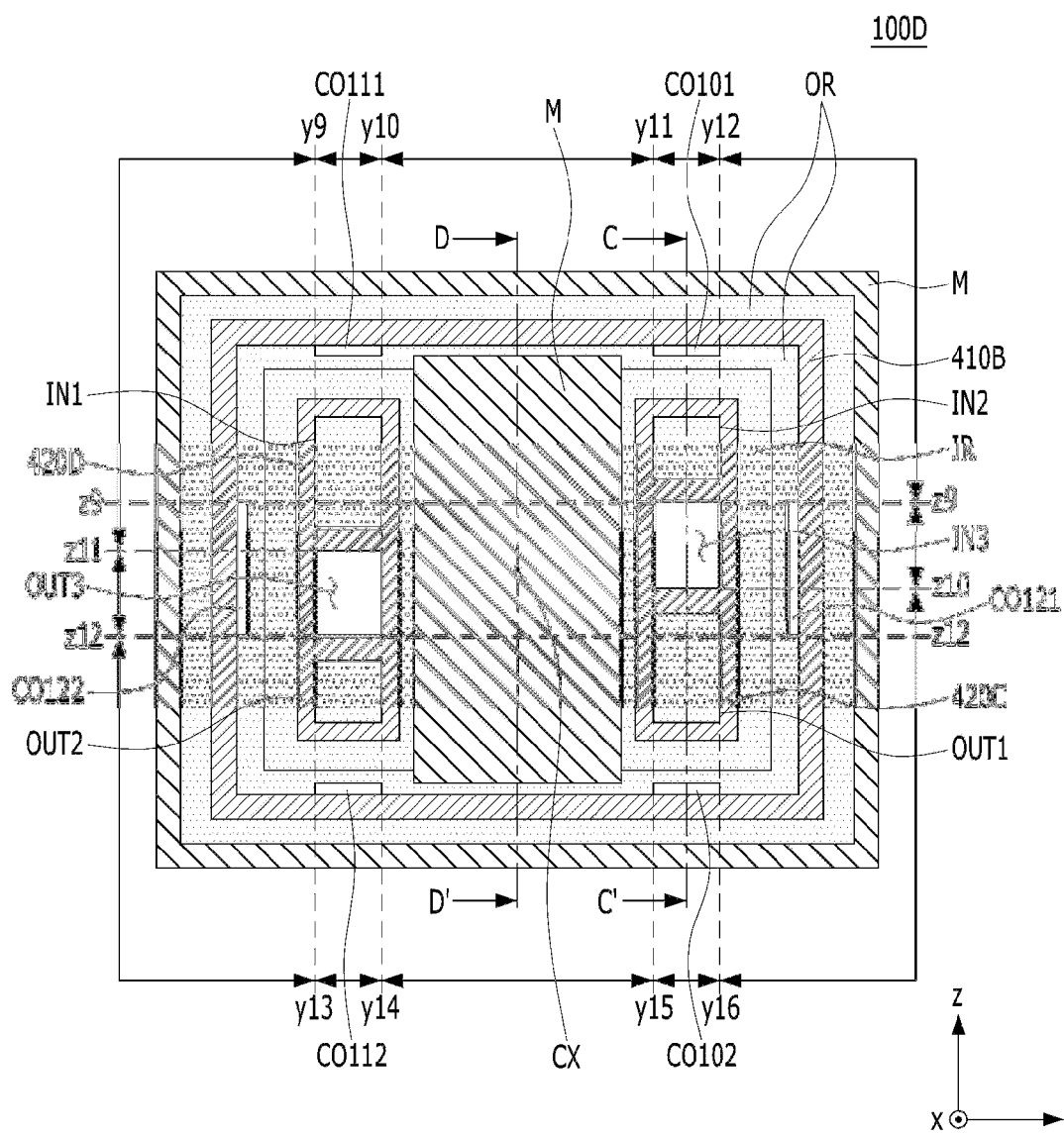
FIG. 9 is a view showing a portion of a fuel cell according to still another embodiment.
Figure 10:
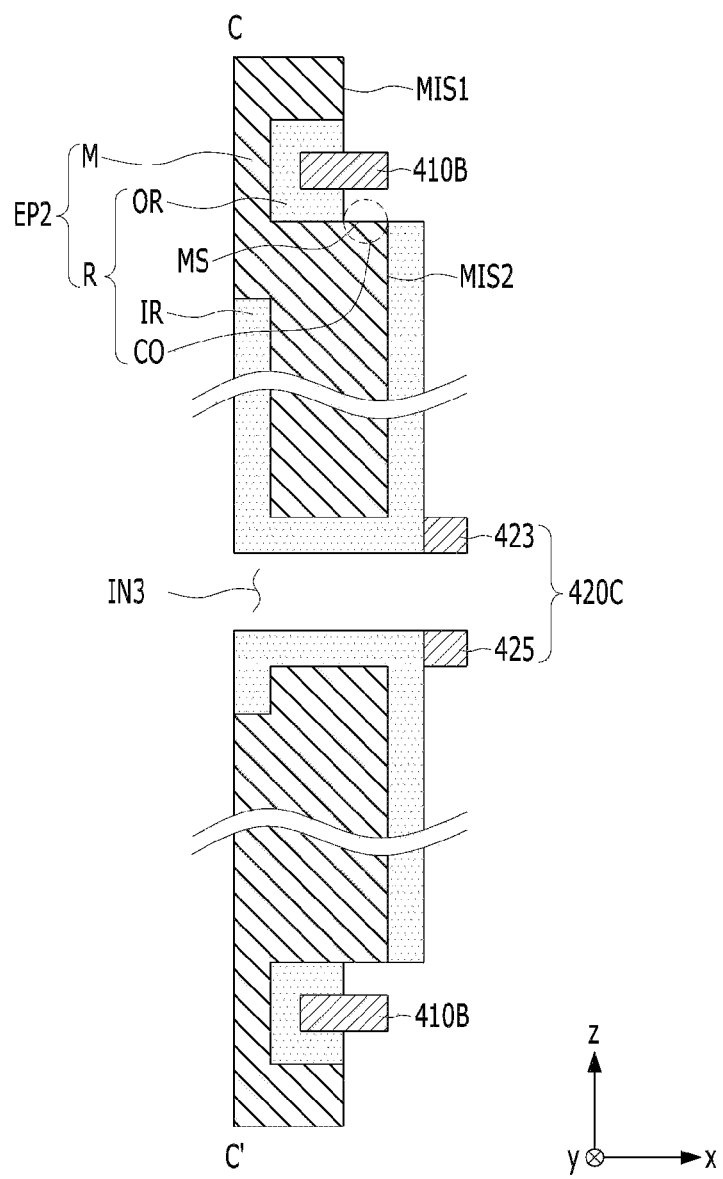
FIG. 10 is a cross-sectional view taken along line C-C' in the fuel cell shown in FIG. 9.

FIG. 9 is a view showing a portion of a fuel cell 100D according to still another embodiment, and FIG. 10 is a cross-sectional view taken along line C-C' in the fuel cell 100D shown in FIG. 9.

Since the cross-sectional view taken along line D-D' in the fuel cell 100D shown in FIG. 9 is similar to FIG. 5, a duplicate description thereof will be omitted.

For convenience of description, FIGS. 9 and 10 illustrate only a second end plate EP2, an outer gasket 410B, and inner gaskets 420C and 420D of the fuel cell 100D.

The second end plate EP2, the coolant inlet IN3, and the coolant outlet OUT3 shown in FIGS. 9 and 10 correspond to the second end plate 110B, the third inflow communication portion IN3, and the third outflow communication portion OUT3 described above, respectively. According to another embodiment, in FIG. 9, "IN3" may correspond to a coolant outlet, and "OUT3" may correspond to a coolant inlet.

The coolant inlet IN3 and the coolant outlet OUT3 may be disposed opposite each other while being spaced apart from each other in the second direction.

Referring to FIGS. 9 and 10, the second end plate EP2 may include a metal part M and a resin part R.

The metal part M of the second end plate EP2 may include a first inner surface MIS1 and a second inner surface MIS2. The first inner surface MIS1 is a surface that faces the enclosure 300 in the first direction, and the second inner surface MIS2 is a surface that is located under the first inner surface MIS1 and faces the second end cell heater 112B in the first direction. The second inner surface MIS2 may have a cross-sectional shape that protrudes further than the first inner surface MIS1 toward the unit cell 122-N of the cell stack 122 in the first direction.

The resin part R may include an outer resin part OR and an inner resin part IR. The outer resin part OR may be embedded inside the first inner surface MIS1 of the metal part M, and the inner resin part IR may be disposed on the second inner surface MIS2 of the metal part M.

The outer gasket 410B may be inserted between the second end plate 110B and the enclosure 300 to perform waterproofing and dustproofing functions, thereby protecting the cell stack 122 from the outside. The outer gasket 410B may also prevent the internal environment of the cell stack 122 from being exposed to the outside. To this end, the outer gasket 410B may be disposed between the resin part R of the second end plate EP2, i.e. the outer resin part OR, and the enclosure 300. For example, as shown in FIG. 10, the outer gasket 410B may be embedded in the outer resin part OR.

The inner gaskets 420C and 420D serve to maintain airtightness of the flow paths for the reactant gases and coolant between the second end plate 110B and the second end cell heater 112B. To this end, the inner gaskets 420C and 420D may be disposed between the inner resin part IR of the second end plate EP2 and the second end cell heater 112B. The inner gaskets 420C (423 and 425) and 420D may be disposed on the inner resin part IR around the manifolds. For example, the third inner gasket 420C may be disposed at positions corresponding to the oxygen inlet IN2 and the hydrogen outlet OUT1 and around the coolant inlet IN3 of the first end plate 110A, and the fourth inner gasket 420D may be disposed at positions corresponding to the hydrogen inlet IN1 and the oxygen outlet OUT2 and around the coolant outlet OUT3 of the first end plate 110A.

In addition, according to the embodiment, similar to the first end plate EP1, the resin part R of the second end plate EP2 may further include a plurality of cutoff portions CO (or cutout portions), which are spaced apart from each other. Each of the cutoff portions CO may extend in the second or third direction and may expose the metal part M.

Each of the cutoff portions included in the resin part R of the second end plate EP2 has the same shape as that shown in FIG. 6, and may be located between the outer resin part OR and the inner resin part IR to expose the metal part M.

According to an embodiment, as illustrated in FIG. 9, the cutoff portions included in the resin part R of the second end plate EP2 may include tenth cutoff portions CO101 and CO102, eleventh cutoff portions CO111 and CO112, and twelfth cutoff portions CO121 and CO122.

Figure 11:
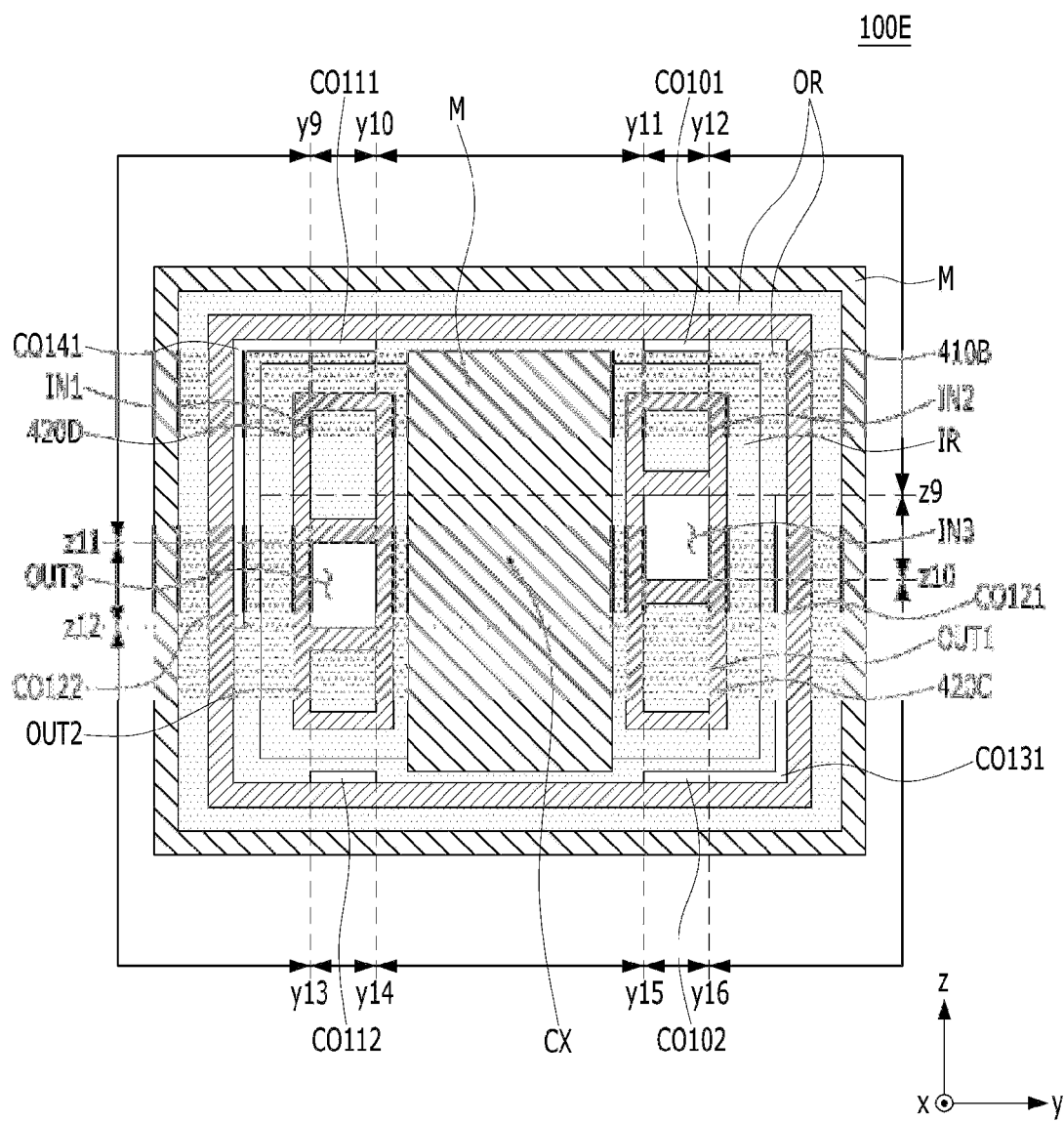
FIG. 11 is a view showing a portion of a fuel cell according to still another embodiment.
Figure 12:
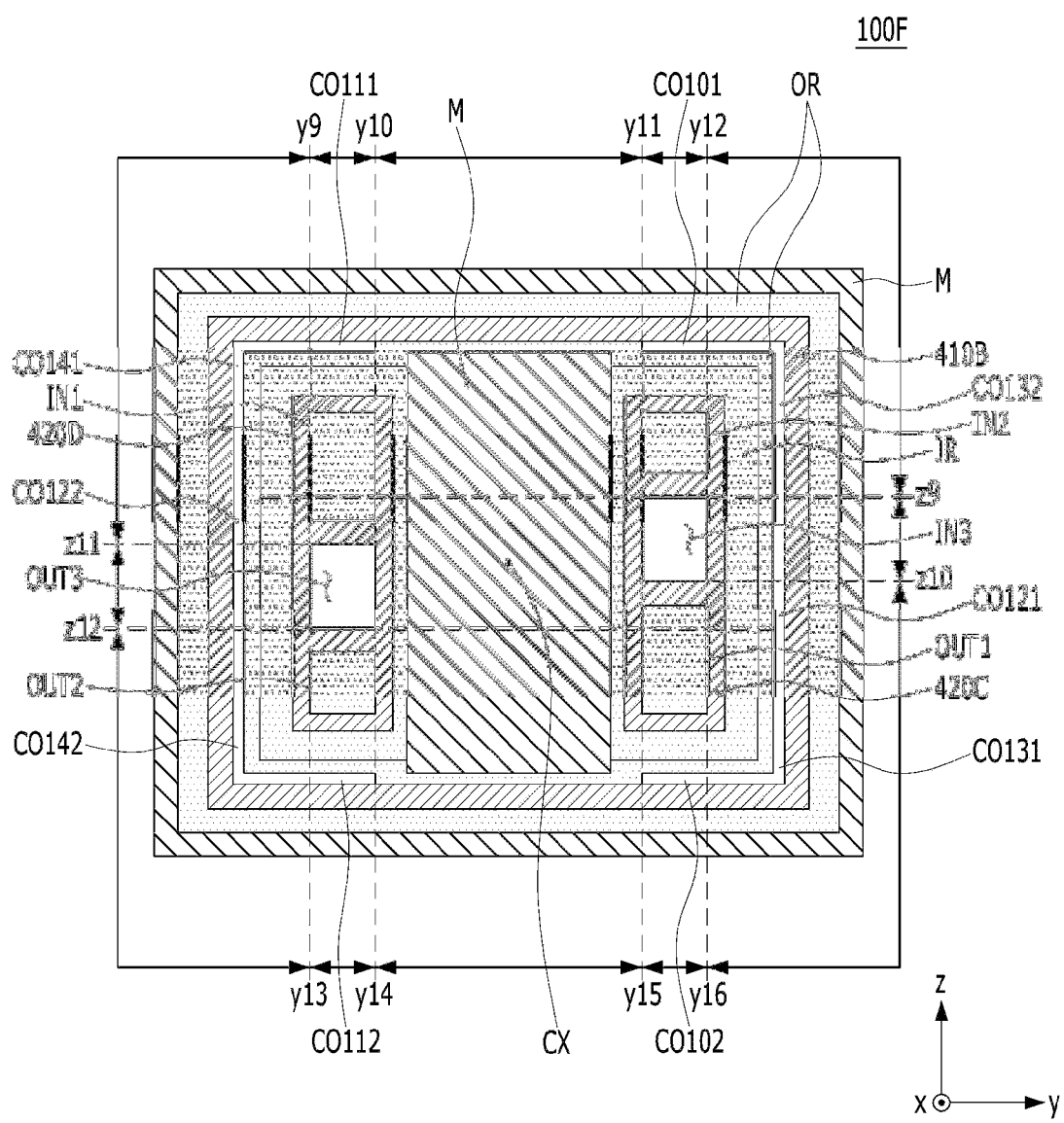
FIG. 12 is a view showing a portion of a fuel cell according to still another embodiment.

In FIG. 9 and FIGS. 11 and 12 to be described later, the cutoff portions CO are not visible. However, for better understanding, areas in which the cutoff portions are disposed are indicated in each drawing.

The tenth cutoff portions CO101 and CO102 may have a shape that overlaps the coolant inlet IN3 in the third direction. For example, the length of the tenth cutoff portions CO101 and CO102 in the second direction may be less than or equal to the length of the coolant inlet IN3 in the second direction. The 10-$1^{st}$ cutoff portion CO101 may be located between y11 and y12, and the 10-$2^{nd}$ cutoff portion CO102 may be located between y15 and y16.

The eleventh cutoff portions CO111 and CO112 may have a shape that overlaps the coolant outlet OUT3 in the third direction. For example, the length of the eleventh cutoff portions CO111 and CO112 in the second direction may be less than or equal to the length of the coolant outlet OUT3 in the second direction. The 11-$1^{st}$ cutoff portion CO11 may be located between y9 and y10, and the 11-$2^{nd}$ a cutoff portion CO112 may be located between y13 and y14.

The twelfth cutoff portions CO121 and CO122 may have a shape that overlaps one having a greater length in the third direction, among the coolant inlet IN3 and the coolant outlet OUT3, in the second direction. For example, the length of the twelfth cutoff portions CO121 and CO122 in the third direction may be less than or equal to the length of the one having the greater length in the third direction, among the coolant inlet IN3 and the coolant outlet OUT3. In FIG. 9, it is illustrated that the length of the coolant inlet IN3 in the third direction and the length of the coolant outlet OUT3 in the third direction are the same. However, when the length of the coolant inlet IN3 in the third direction is greater than the length of the coolant outlet OUT3 in the third direction, the twelfth cutoff portions CO121 and CO122 may have a shape that overlaps the coolant inlet IN3 in the second direction.

In FIG. 9 and FIGS. 11 and 12 to be described later, the oxygen inlet IN2 and the hydrogen outlet OUT1 are respectively located above and below the coolant inlet IN3, and the hydrogen inlet IN1 and the oxygen outlet OUT2 are respectively located above and below the coolant outlet OUT3. The oxygen inlet IN2, the hydrogen outlet OUT1, the hydrogen inlet IN1, and the oxygen outlet OUT2 shown in FIGS. 9, 11 and 12 are disposed at the same positions as and have the same shapes as the oxygen inlet IN2, the hydrogen outlet OUT1, the hydrogen inlet IN1, and the oxygen outlet OUT2 shown in FIGS. 3, 7 and 8, respectively. However, in order to help understanding of another embodiment, the positions and shapes of the oxygen inlet IN2, the hydrogen outlet OUT1, the hydrogen inlet IN1, and the oxygen outlet OUT2 are illustrated differently from those illustrated in FIGS. 3, 7 and 8.

Alternatively, as shown in FIG. 9, the twelfth cutoff portions CO121 and CO122 may have a shape that overlaps not only the coolant inlet IN3 but also the coolant outlet OUT3 in the third direction. That is, when the coolant inlet IN3 is located between z9 and z10 and the coolant outlet OUT3 is located between z11 and z12, the twelfth cutoff portions CO121 and CO122 may be located between z9 and z12. Each of the 12-$1^{st}$ cutoff portion CO121 and the 12-$2^{nd}$ cutoff portion CO122 may be located between z9 and z12.

FIG. 11 is a view showing a portion of a fuel cell 100E according to still another embodiment.

Unlike what is illustrated in FIG. 9, the resin part R of the second end plate EP2 shown in FIG. 11 further includes 13-$1^{st}$ and 14-$1^{st}$ cutoff portions. Except for this, the fuel cell 100E shown in FIG. 11 is the same as the fuel cell 100D shown in FIG. 9. The same parts are denoted by the same reference numerals, and a duplicate description thereof will be omitted.

The 13-$1^{st}$ cutoff portion CO131 may be disposed between one CO121 of the twelfth cutoff portions CO121 and CO122 and one CO102 of the tenth cutoff portions CO101 and CO102. That is, the 13-$1^{st}$ cutoff portion CO131 may be located between y1$^6$ and z10.

The 14-$1^{st}$ cutoff portion CO141 may be disposed between one CO11 of the eleventh cutoff portions CO111 and CO112 and the other one CO122 of the twelfth cutoff portions CO121 and CO122. That is, the 14-$1^{st}$ cutoff portion CO141 may be located between y9 and z11.

FIG. 12 is a view showing a portion of a fuel cell 100F according to still another embodiment.

Unlike what is illustrated in FIG. 11, the resin part R of the second end plate EP2 shown in FIG. 12 further includes 13-$2^{nd}$ and 14-$2^{nd}$ cutoff portions. Except for this, the fuel cell 100F shown in FIG. 12 is the same as the fuel cell 100E shown in FIG. 11. The same parts are denoted by the same reference numerals, and a duplicate description thereof will be omitted.

The 13-$2^{nd}$ cutoff portion CO132 may be disposed between one CO121 of the twelfth cutoff portions CO121 and CO122 and the other one CO1o1 of the tenth cutoff portions CO1o and CO102. That is, the 13-$2^{nd}$ cutoff portion CO132 may be located between y12 and z9.

The 14-$2^{nd}$ cutoff portion CO142 may be disposed between the other one CO112 of the eleventh cutoff portions CO111 and CO112 and the other one CO122 of the twelfth cutoff portions CO121 and CO122. That is, the 14-$2^{nd}$ cutoff portion CO142 may be located between y13 and z12.

In conclusion, among the cutoff portions shown in FIGS. 3, 7, 8, 9, 11 and 12, the cutoff portions extending in the second direction overlap the manifolds M (IN1, IN2, IN3, OUT1, OUT2 and OUT3) in the third direction, and the cutoff portions extending in the third direction overlap the manifolds M (IN1, IN2, IN3, OUT1, OUT2 and OUT3) in the second direction.

In addition, according to the embodiment, the cutoff portions described above may have a shape symmetrical in at least one of the second direction or the third direction. Alternatively, the cutoff portions described above may have a shape symmetrical with respect to the center axis CX in the fuel cell 100A to 100F.

As described above, when the cutoff portions are symmetric, the resin parts R included in the end plates 110A and 110B, i.e. the outer resin parts 410A and 410B and the inner resin parts 420A to 420D, may be manufactured in a uniform form. This will be described later in detail in a manufacturing method with reference to FIGS. 18A and 18B.

For example, referring to FIGS. 3, 7 and 8, the 1-$1^{st}$ and 1-$2^{nd}$ cutoff portions Co11 and Co12 are symmetrical in the second direction, the 2-$1^{st}$ and 2-$2^{nd}$ a cutoff portions CO21 and Co22 are symmetrical in the second direction, the 3-$1^{st}$ and 3-$2^{nd}$ cutoff portions CO31 and Co32 are symmetrical in the third direction, and the 4-$1^{st}$ and 4-$2^{nd}$ cutoff portions Co41 and Co42 are symmetrical in the third direction.

In addition, referring to FIG. 7, the fifth cutoff portion CO5 is symmetrical with the sixth cutoff portion CO6 in the second direction, and is symmetrical with the seventh cutoff portion CO7 in the third direction. In addition, the eighth cutoff portion CO8 is symmetrical with the seventh cutoff portion CO7 in the second direction, and is symmetrical with the sixth cutoff portion CO6 in the third direction.

In addition, referring to FIG. 8, the $9\text{-}1^{st}$ cutoff portion Co91 is symmetrical with the $9\text{-}2^{nd}$ cutoff portion CO92 in the second direction.

In addition, referring to FIGS. 9, 11 and 12, the $10\text{-}1^{st}$ and $10\text{-}2^{nd}$ cutoff portions Co101 and CO102 are symmetrical in the third direction, the $11\text{-}1^{st}$ and $11\text{-}2^{nd}$ cutoff portions Co111 and Co112 are symmetrical in the third direction, and the $12\text{-}1^{st}$ and $12\text{-}2^{nd}$ a cutoff portions Co121 and Co112 are symmetrical in the second direction.

The fuel cell 100 according to the embodiment may further include an outer groove and an inner groove.

Figure 13:
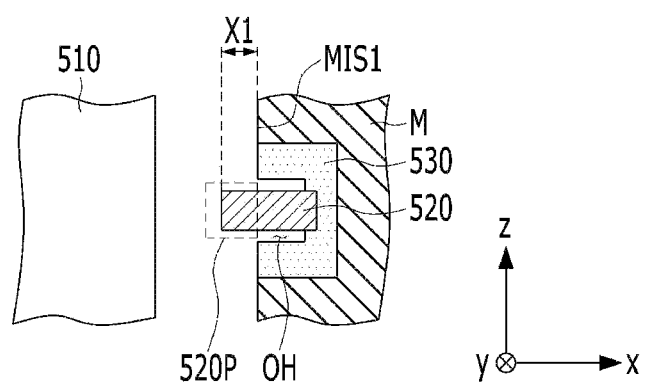
FIG. 13 is a cross-sectional view showing a portion of the fuel cell to explain an outer groove according to an embodiment.
Figure 14:
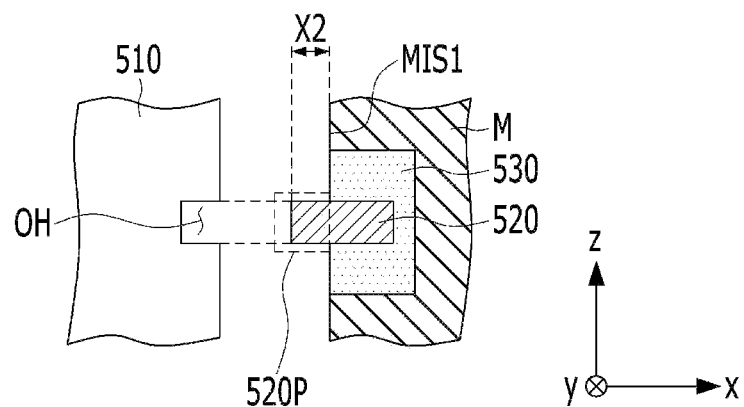
FIG. 14 is a cross-sectional view showing a portion of the fuel cell to explain an outer groove according to another embodiment.

FIG. 13 is a cross-sectional view showing a portion of the fuel cell 100 to explain an outer groove OH according to an embodiment, and FIG. 14 is a cross-sectional view showing a portion of the fuel cell 100 to explain an outer groove OH according to another embodiment.

The enclosure 510, the outer gasket 520, the outer resin part 530, and the metal part M shown in FIGS. 13 and 14 may correspond to the enclosure 300, the outer gasket 410A and 410B, the outer resin part OR, and the metal part M described above, respectively.

An outer protrusion 520P in the outer gasket 520 may protrude toward the enclosure 510, and may be received in the outer groove OH.

When the length X1 by which the outer protrusion 520P protrudes from the first inner surface MIS1 of the metal part M in the first direction is less than or equal to a predetermined length, the outer groove OH may be formed in the outer resin part 530, as shown in FIG. 13.

Alternatively, when the length X2 by which the outer protrusion 520P protrudes from the first inner surface MIS1 of the metal part M in the first direction is greater than the predetermined length, the outer groove OH may be formed in the enclosure 510, as shown in FIG. 14.

For example, the predetermined length may be 1 mm, but the embodiment is not limited thereto.

Figure 15:
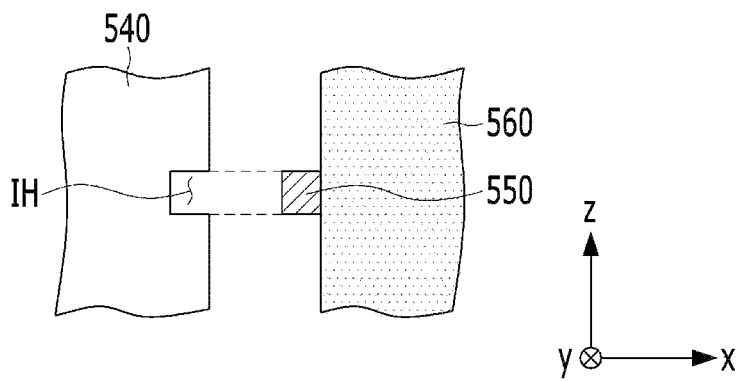
FIG. 15 is a cross-sectional view showing a portion of the fuel cell to explain an inner groove according to an embodiment.

FIG. 15 is a cross-sectional view showing a portion of the fuel cell 100 to explain an inner groove IH according to an embodiment. The end cell heater 540, the inner gasket 550, and the inner resin part 560 shown in FIG. 15 may correspond to the end cell heaters 112A and 112B, the inner gaskets 420A to 420D, and the inner resin part IR described above, respectively.

The inner groove IH serves to receive the inner gaskets 420A to 420D protruding toward the end cell heaters 112A and 112B. To this end, the inner groove IH may be formed in the end cell heater 540, as shown in FIG. 15.

Similar to the configuration in which the outer groove OH is formed in the outer resin part OR, the inner groove IH may be formed in the inner resin part 560 depending on the height to which the inner gasket 550 protrudes in the first direction.

Figure 16:
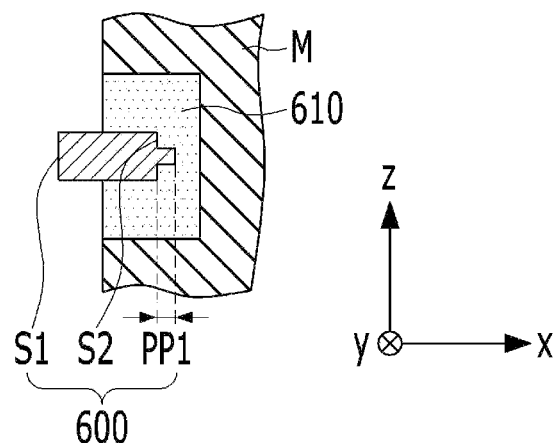
FIG. 16 is a cross-sectional view showing a first fixing portion of the fuel cell according to an embodiment.

FIG. 16 is a cross-sectional view showing a first fixing portion of the fuel cell 100 according to an embodiment.

The outer gasket 600 and the outer resin part 610 shown in FIG. 16 may correspond to the outer gaskets 410A and 410B and the outer resin part OR described above, respectively.

The outer gasket 600 may include a first outer surface S1, a first inner surface S2, and a first fixing portion PP1.

The first outer surface S1 may be defined as a surface that faces the enclosure 300 in the first direction, and the first inner surface S2 may be defined as a surface that is opposite the first outer surface S1 and faces the outer resin part 610.

The first fixing portion PP1 may have a protrusion shape that protrudes from the first inner surface S2 toward the outer resin part 610. Although it is illustrated in FIG. 16 that the first fixing portion PP1 protrudes from the first inner surface S2 in the first direction, the embodiment is not limited as to the specific direction in which the first fixing portion PP1 protrudes.

When the outer gasket 600 and the outer resin part 610 are made of a material having chemical bonding properties (or adhesiveness) to each other, the first fixing portion PP1 may be omitted. However, when the outer gasket 600 and the outer resin part 610 are not made of a material having bonding properties to each other, the first fixing portion PP1 is formed to increase the contact area between the outer gasket 600 and the outer resin part 610, thereby increasing the engagement force between the outer gasket 600 (410A and 410B) and the outer resin part 610 (OR).

Figure 17:
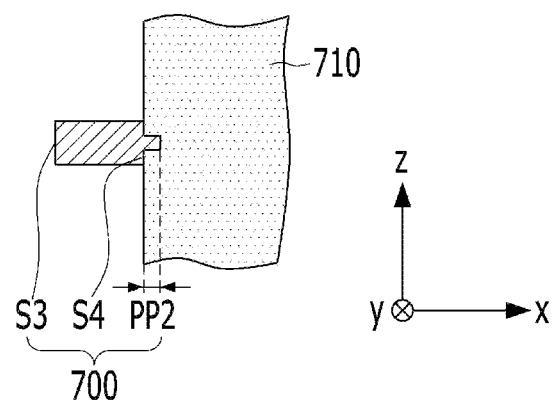
FIG. 17 is a cross-sectional view showing a second fixing portion of the fuel cell according to an embodiment.

FIG. 17 is a cross-sectional view showing a second fixing portion of the fuel cell 100 according to an embodiment.

The inner gasket 700 and the inner resin part 710 shown in FIG. 17 may correspond to the inner gasket 420A to 420D and the inner resin part IR described above, respectively.

The inner gasket 700 may include a second outer surface S3, a second inner surface S4, and a second fixing portion PP2.

The second outer surface S3 may be defined as a surface that faces the end cell heaters 112A and 112B in the first direction, and the second inner surface S4 may be defined as a surface that is opposite the second outer surface S3 and faces the inner resin part 710.

The second fixing portion PP2 may have a protrusion shape that protrudes from the second inner surface S4 toward the inner resin part 710.

When the inner gasket 700 (420A to 420D) and the inner resin part 710 (IR) are made of a material having chemical bonding properties (or adhesiveness) to each other, the second fixing portion PP2 may be omitted. However, when the inner gasket 700 (420A to 420D) and the inner resin part 710 (IR) are not made of a material having bonding properties to each other, the second fixing portion PP2 is formed to increase the contact area between the inner gasket 700 (420A to 420D) and the inner resin part 710 (IR), thereby increasing the engagement force between the inner gasket 700 (420A to 420D) and the inner resin part 710 (IR).

Hereinafter, a method of manufacturing the fuel cell 100 according to the above-described embodiment will be described with reference to FIGS. 18A, 18B and 4.

Figure 18A:
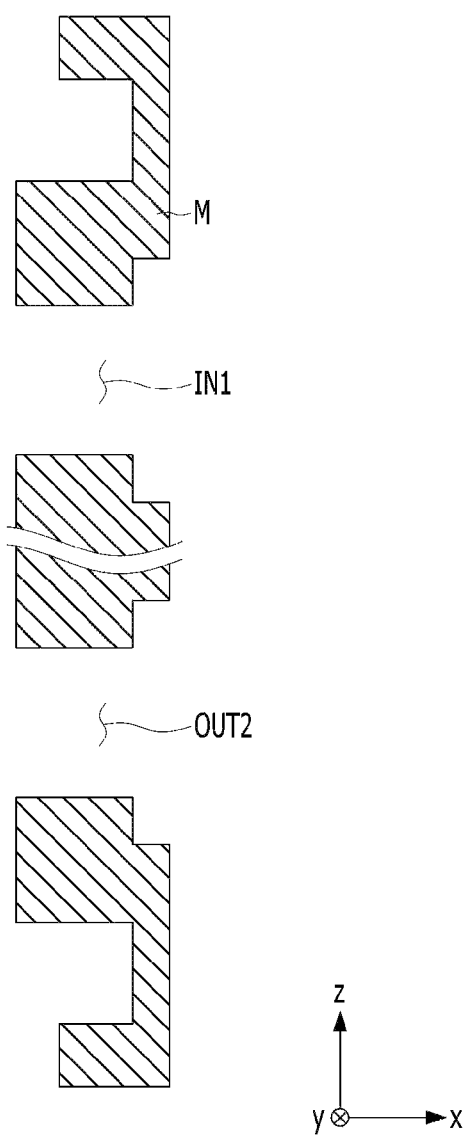
FIGS. 18A and 18B are cross-sectional views showing a process of manufacturing the first end plate shown in FIGS. 3 and 4.
Figure 18B:
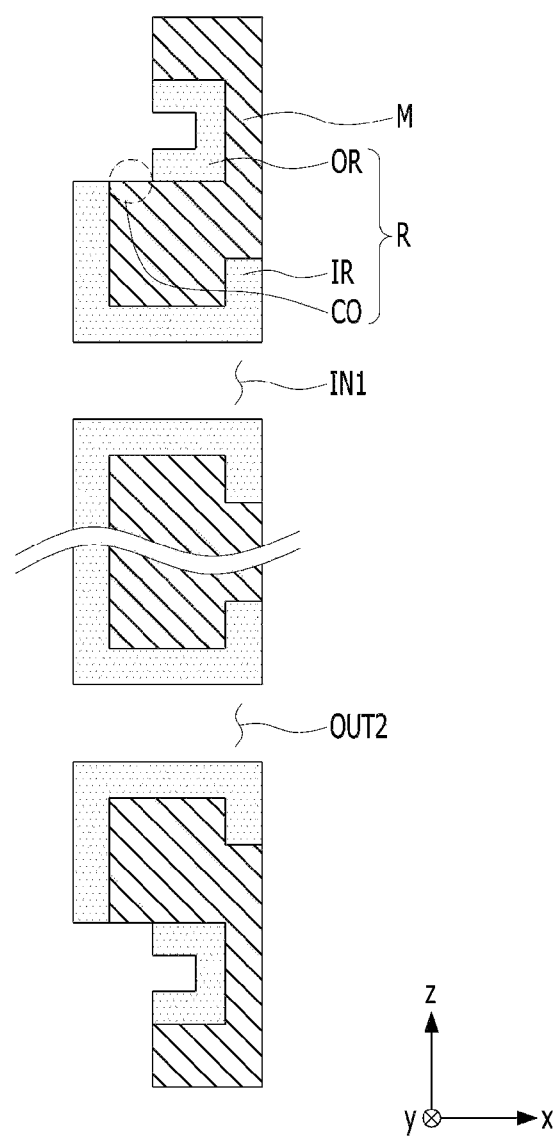

FIGS. 18A and 18B are cross-sectional views showing a process of manufacturing the first end plate 110A (EP1) shown in FIGS. 3 and 4.

First, a metal part M having a cross-sectional shape shown in FIG. 18A is manufactured.

Subsequently, as shown in FIG. 18B, a resin part R, which includes an outer resin part OR, an inner resin part IR, and a cutoff portion CO, is formed on the metal part M through a primary injection-molding process.

Subsequently, as shown in FIG. 4, an outer gasket 410A is formed on the outer resin part OR, and an inner gasket 420A is formed on the inner resin part IR through a secondary injection-molding process. In this case, when the inner gasket 420A is formed, the inner gasket 420B is also formed at the same time. That is, it can be seen that the inner resin part IR, the outer resin part OR, the outer gasket 410A, and the inner gaskets 420A and 420B are formed through a double injection-molding process.

In addition, the outer resin part OR, the inner resin part IR, the outer gasket 410B, and the inner gaskets 420C and 420D of the second end plate 110B may also be formed through a double injection-molding process, like the outer resin part OR, the inner resin part IR, the outer gasket 410A, and the inner gaskets 420A and 420B.

As described above, when formed through a double injection-molding process, the resin part R (OR and IR), the outer gaskets 410A and 410B, and the inner gaskets 420A to 420D may be integrated.

In addition, in order to form the resin part R, injection resin may be heated, and may be injected into six points through gates of an injection mold to be charged in the mold (the positions and number of gates may vary depending on the design of the mold).

In the case in which the cutoff portions are asymmetric, a sink mark is likely to generate at the point at which resin injected through different gates meets, which may increase the time required to establish the injection-molding conditions. In addition, in the case in which the injection resin does not smoothly flow, air may be introduced thereinto after removal of the mold or the injection-molded product may be defective.

However, according to the embodiments, since the cutoff portions are symmetrical, resin injected through different gates flows the same distance in the same charging time, so flowability thereof is improved, thereby enabling achievement of high uniformity of injection-molded products.

Hereinafter, a fuel cell according to a comparative example and the fuel cell according to the embodiment will be compared.

Figure 19:
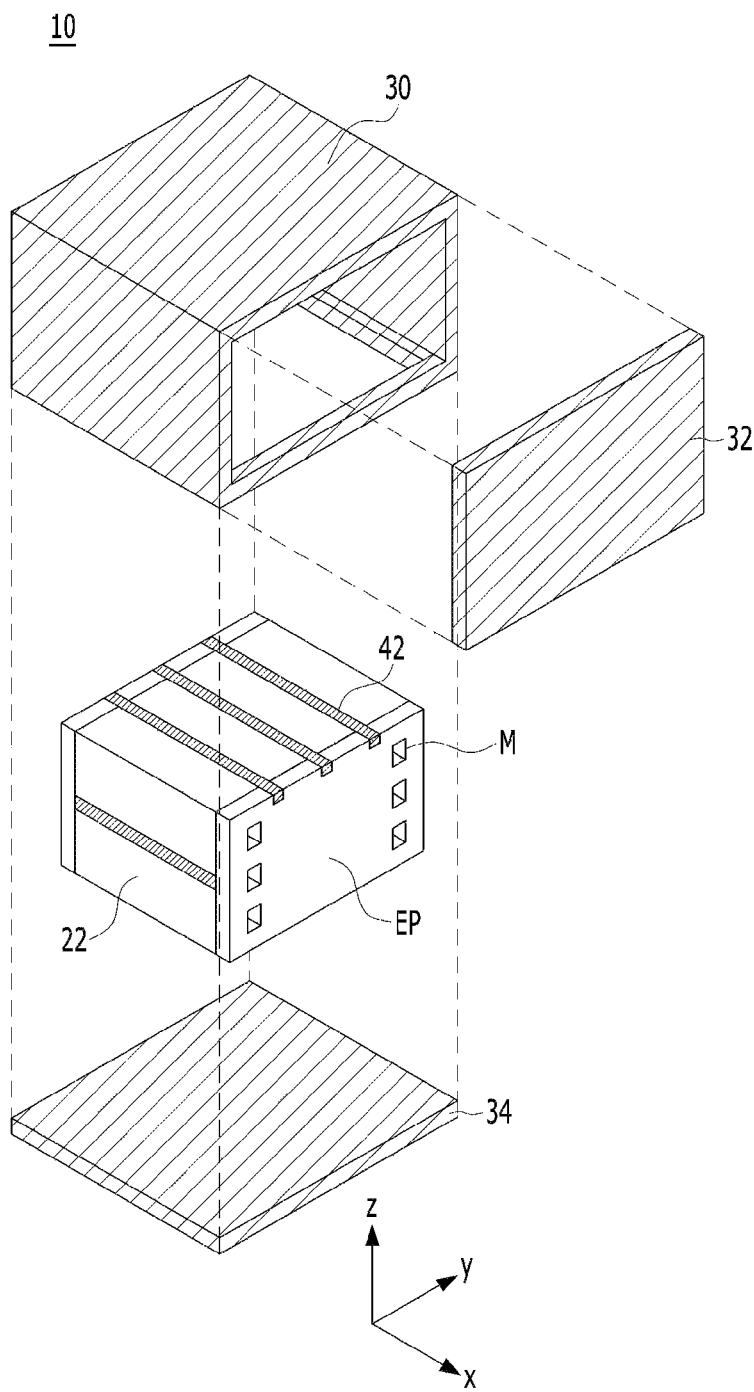
FIG. 19 is an exploded perspective view of a fuel cell according to a comparative example.

FIG. 19 is an exploded perspective view of a fuel cell 10 according to a comparative example.

The fuel cell 10 according to the comparative example shown in FIG. 19 includes an enclosure 30, 32 and 34 and a power generator. The enclosure 30, 32 and 34 is composed of an upper cover 30, a side cover 32, and a lower cover 34, and serves to protect the power generator from the outside of the fuel cell 10.

The power generator includes a cell stack 22, end plates EP disposed on both sides of the cell stack 22, and a clamping bar 42. As shown in FIG. 19, the cell stack 22 may perform the same role as the cell stack 122 shown in FIG. 2, and the end plates EP may perform the same role as the end plates 110A and 110B according to the embodiment, and may include a manifold M.

The cell stack 22, in which a plurality of unit cells is stacked, is placed between the end plates EP. Thereafter, a clamping load is applied to the cell stack 22 to compress the same. In the compressed state of the cell stack 22, the clamping bar 42 is fitted into the end plates EP, and a bolt is fastened into the end plates EP, thereby maintaining the force that clamps the cell stack 22 disposed in the space between the end plates EP and maintains the compressed state thereof.

Further, unlike what is illustrated in FIG. 19, in the case in which the fuel cell 10 according to the comparative example includes two cell stacks stacked in the third direction, perpendicular to the first direction, which is the cell-stacking direction, the fuel cell 10 may further include a manifold block, which serves as a fluid supply passage and controls the flow of fluids, i.e. the reactant gases and the coolant, to the two cell stacks. In the fuel cell 10 according to this comparative example, inflow/outflow of the reactant gases and the coolant into/out of the two cell stacks and insulation, protection and watertightness of the two cell stacks may be realized by the enclosure 30 and the manifold block, which surround the two cell stacks.

In the fuel cell 10, a sealing gasket is provided at the engagement interface between the manifold block and the enclosure 30 in order to realize waterproofing and dustproofing functions and thus to protect the cell stack 22 from the outside. To this end, a gasket-receiving groove is formed in the manifold block, and the sealing gasket is inserted into the receiving groove. In the case of the fuel cell according to this comparative example, the inward portion of the gasket is cut out in proportion to the volume of the cell stack in the process of manufacturing the gasket, and the cut portion of the gasket is discarded, rather than being recycled, resulting in increased material costs.

In contrast, in the case of the embodiment, the outer gaskets 410A and 410B and the inner gaskets 420A to 420D are not inserted into the resin parts R of the end plates 110A and 110B through a cutting process, but are integrally formed with the resin parts R through a double injection-molding process, as shown in FIGS. 18A and 18B. Accordingly, unlike the comparative example, there is no portion of the gasket that is cut and discarded, resulting in reduced material costs.

Further, in the case of the comparative example in which the sealing gaskets, which correspond to the outer gaskets of the embodiment, and the end plates are provided separately, when the enclosure 30 is inserted between the end plates EP in a pressed state, the sealing gaskets may be pushed and separated from the end plates, thus leading to erroneous assembly. Furthermore, because the separate sealing gaskets are manually inserted into the end plates, the manufacturing process may be delayed, and the separate sealing gaskets may be lost during transportation thereof, and may be separated during assembly.

In contrast, in the embodiment, the outer gaskets 410A and 410B and the inner gaskets 420A to 420D are integrally formed with the resin part R through a double injection-molding process, rather than a manual assembly process. Therefore, unlike the comparative example, the gaskets are not pushed and separated from the resin part, there is no possibility of erroneous assembly of the fuel cell and separation of the gaskets and a process of inserting the gaskets is eliminated. Therefore, according to the embodiment, a process of manufacturing the fuel cell is simplified, a manufacturing time is shortened, and the above-mentioned problems that may occur during transportation and assembly are prevented. As a result, the quality of the fuel cell 100 is guaranteed.

In addition, according to the embodiment, when there is a need to replace the outer gaskets 410A and 410B and the inner gaskets 420A to 420D due to defect or deterioration, the outer gaskets 410A and 410B and the inner gaskets 420A to 420D are scraped off the resin part R so that the resin part R has the shape shown in FIG. 18B, and thereafter, new outer gaskets 410A and 410B and inner gaskets 420A to 420D are formed through an injection-molding process. In this way, it is possible to reuse the resin part R shown in FIG. 18B. In this case, the outer gaskets 410A and 410B and the inner gaskets 420A to 420D may be separately manufactured and inserted into the resin part R. Due to the reuse of the resin part R, it is possible to reduce maintenance and repair costs.

In addition, according to the comparative example, since the manifold block is implemented in various forms through an injection-molding process of insulating plastic, it is easy to form a receiving groove for receiving a gasket in the manifold block. However, in the case in which the cell stack is implemented in a single-layer form, the enclosure 30 is engaged with the end plates EP, rather than being engaged with the manifold block. In this case, since the end plates EP which serves as the manifold block need to have structural stiffness, a metal material is used to manufacture the same. Therefore, a receiving groove for receiving the sealing gasket is formed by machining the metallic portions of the end plates EP. Accordingly, the processing time taken to form the gasket-receiving groove is increased, and thus manufacturing efficiency is deteriorated. That is, the cycle time (CT) of the gasket-receiving groove may be increased. Further, in general, since the gasket-receiving groove, which matches the size of the sealing gasket, has a thin and deep cross-section, a tool for forming the gasket-receiving groove is worn out in a very short time, and is thus frequently replaced.

In contrast, according to the embodiment, the outer gaskets 410A and 410B and the inner gaskets 420A to 420D are integrally formed with the resin part R of the end plates 110A and 110B through a double injection-molding process, rather than with the metal part M of the end plates 110A and 110B. Accordingly, compared to the comparative example, according to the embodiment, the period required for the process of manufacturing the fuel cell may be shortened, manufacturing efficiency may be improved, and problems such as abrasion of a processing tool may be prevented.

In addition, as described above, the resin part R of the embodiment includes a plurality of cutoff portions CO. When the cutoff portions CO are present, the area of the metal part M may be increased compared to when there is no cutoff portion. Thus, the rigidity of the end plates 110A and 110B may be increased. In addition, due to the presence of the cutoff portions, the resin part R, i.e. the outer resin part OR and the inner resin part IR, may be prevented from lifting. In addition, due to the presence of the cutoff portions, engagement (or bonding) between the metal part M and the resin part R may be enhanced in the injection-molding process of the resin part R of the end plates 110A and 110B. The reason for this is that, when there are cutoff portions, grooves or stepped portions, into which the resin is to be introduced, are formed, and accordingly, the shape becomes complicated.

As is apparent from the above description, according to the fuel cell of the embodiments, the outer resin part and the inner resin part may be manufactured in a uniform form. Even when the outer gasket and the outer resin part are not made of a material having bonding properties to each other, the engagement force between the outer gasket and the outer resin part may be increased, and even when the inner gasket and the inner resin part are not made of a material having bonding properties to each other, the engagement force between the inner gasket and the inner resin part may be increased. In addition, manufacturing costs may be reduced, a manufacturing process may be simplified, a manufacturing period may be shortened, and transportation efficiency and assembly efficiency may be improved, with the result that the quality of the fuel cell may be guaranteed. In addition, maintenance and repair costs may be reduced, problems such as abrasion of a processing tool may be prevented, the rigidity of the end plates may be increased, lifting of the outer resin part and the inner resin part may be prevented, and engagement between the metal part and the resin part may be enhanced.

The above-described various embodiments may be combined with each other without departing from the objects of the present disclosure unless they are incompatible with each other. In addition, for any element that is not described in detail in any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell, comprising:
   a cell stack comprising a plurality of unit cells stacked in a first direction;
   a first end plate disposed at a first end of the cell stack and a second end plate disposed at a second end of the cell stack, the first end plate and the second end plate each comprising a metal part and a resin part;
   an enclosure engaged with the first and the second end plates so as to surround the cell stack;
   a first outer gasket disposed between the resin part of the first end plate and the enclosure;
   a second outer gasket disposed between the resin part of the second end plate and the enclosure; and
   a first end cell heater disposed between a first cell located at the first end of the cell stack and the first end plate;
   wherein the resin part of the first end plate and the resin part of the second end plate each comprise a plurality of cutoff portions spaced apart from each other;
   wherein each of the plurality of cutoff portions extends in a second direction intersecting the first direction or in a third direction intersecting each of the first direction and the second direction to expose the metal part of the first end plate and the metal part of the second end plate, respectively;
   wherein the metal part of the first end plate comprises:
      a first inner surface facing the enclosure in the first direction; and
      a second inner surface located under the first inner surface and facing the first end cell heater in the first direction;
   wherein the resin part of the first end plate comprises:
      an outer resin part embedded inside the first inner surface of the metal part of the first end plate such that the first outer gasket is disposed thereon; and
      an inner resin part disposed on the second inner surface of the metal part of the first end plate; and
   wherein one of the plurality of cutoff portions is located between the outer resin part and the inner resin part of the first end plate to expose the metal part of the first end plate.

2. The fuel cell according to claim 1, further comprising:
   a second end cell heater disposed between a second cell located at the second end of the cell stack and the second end plate; and
   a first inner gasket disposed around a manifold between the resin part of the first end plate and the first end cell heater and a second inner gasket disposed around the manifold between the resin part of the second end plate and the second end cell heater.

3. The fuel cell according to claim 2, wherein the resin part of the first end plate, the first outer gasket, and the first inner gasket are integrally formed with each other.

4. The fuel cell according to claim 2, wherein:
among the plurality of cutoff portions, a cutoff portion extending in the second direction overlaps the manifold in the third direction; and
among the plurality of cutoff portions, a cutoff portion extending in the third direction overlaps the manifold in the second direction.

5. The fuel cell according to claim 4, wherein each of the plurality of cutoff portions has a shape symmetrical in at least one of the second direction or the third direction.

6. The fuel cell according to claim 4, wherein the manifold comprises:
a hydrogen inlet and an oxygen inlet disposed opposite each other and spaced apart from each other in the second direction;
an oxygen outlet disposed below the hydrogen inlet and spaced apart from the hydrogen inlet in the third direction;
a hydrogen outlet disposed below the oxygen inlet and spaced apart from the oxygen inlet in the third direction; and
a coolant inlet and a coolant outlet disposed so as to be spaced apart from each other in the second direction.

7. The fuel cell according to claim 6, wherein the plurality of cutoff portions included in the first end plate comprises:
a first cutoff portion overlapping one having a greater length in the third direction, among the hydrogen inlet and the oxygen inlet, in the second direction;
a second cutoff portion overlapping one having a greater length in the third direction, among the hydrogen outlet and the oxygen outlet, in the second direction;
a third cutoff portion overlapping one having a greater length in the second direction, among the hydrogen inlet and the oxygen outlet, in the third direction; and
a fourth cutoff portion overlapping one having a greater length in the second direction, among the oxygen inlet and the hydrogen outlet, in the third direction.

8. The fuel cell according to claim 7, wherein the plurality of cutoff portions further comprises:
a fifth cutoff portion disposed between the first cutoff portion and the third cutoff portion;
a sixth cutoff portion disposed between the first cutoff portion and the fourth cutoff portion;
a seventh cutoff portion disposed between the second cutoff portion and the third cutoff portion; and
an eighth cutoff portion disposed between the second cutoff portion and the fourth cutoff portion.

9. The fuel cell according to claim 8, wherein the plurality of cutoff portions further comprises:
a ninth cutoff portion disposed between the first cutoff portion and the second cutoff portion.

10. The fuel cell according to claim 6, wherein the plurality of cutoff portions included in the second end plate comprises:
a tenth cutoff portion overlapping the coolant inlet in the third direction;
an eleventh cutoff portion overlapping the coolant outlet in the third direction; and
a twelfth cutoff portion overlapping one having a greater length in the third direction, among the coolant inlet and the coolant outlet, in the second direction.

11. The fuel cell according to claim 10, wherein the twelfth cutoff portion has a shape that overlaps the coolant inlet and the coolant outlet in the second direction.

12. The fuel cell according to claim 11, wherein the plurality of cutoff portions further comprises:
a thirteenth cutoff portion disposed between the tenth cutoff portion and the twelfth cutoff portion; and
a fourteenth cutoff portion disposed between the eleventh cutoff portion and the twelfth cutoff portion.

13. The fuel cell according to claim 4,
wherein the second inner surface has a cross-sectional shape that protrudes further than the first inner surface in the first direction.

14. The fuel cell according to claim 1, wherein the inner resin part is disposed on the second inner surface of the metal part of the first end plate such that a first inner gasket is disposed thereon.

15. The fuel cell according to claim 14, further comprising:
an outer groove receiving an outer protrusion protruding from the first outer gasket toward the enclosure; and
an inner groove receiving the first inner gasket protruding toward the first end cell heater.

16. The fuel cell according to claim 15, wherein:
a length by which the outer protrusion protrudes from the first inner surface of the metal part of the first end plate in the first direction is less than or equal to a predetermined length; and
the outer groove is formed in the outer resin part.

17. The fuel cell according to claim 15, wherein:
a length by which the outer protrusion protrudes from the first inner surface of the metal part of the first end plate in the first direction is greater than a predetermined length; and
the outer groove is formed in the enclosure.

18. The fuel cell according to claim 15, wherein the inner groove is formed in the first end cell heater.

19. The fuel cell according to claim 14, wherein the first outer gasket comprises:
a first outer surface facing the enclosure in the first direction;
a first inner surface facing the outer resin part and disposed opposite the first outer surface; and
a first fixing portion having a protrusion shape protruding from the first inner surface toward the outer resin part.

20. The fuel cell according to claim 14, wherein the first inner gasket comprises:
a second outer surface facing the first end cell heater in the first direction;
a second inner surface facing the inner resin part and disposed opposite the second outer surface; and
a second fixing portion having a protrusion shape protruding from the second inner surface toward the inner resin part.

* * * * *